United States Patent [19]
Jain et al.

[11] Patent Number: 5,893,095
[45] Date of Patent: Apr. 6, 1999

[54] SIMILARITY ENGINE FOR CONTENT-BASED RETRIEVAL OF IMAGES

[75] Inventors: Ramesh Jain, San Diego; Bradley Horowitz; Charles E. Fuller, both of San Mateo; Amarnath Gupta, Redwood City; Jeffrey R. Bach; Chiao-fe Shu, both of San Mateo, all of Calif.

[73] Assignee: Virage, Inc., San Mateo, Calif.

[21] Appl. No.: 829,791

[22] Filed: Mar. 28, 1997

Related U.S. Application Data

[60] Provisional application No. 60/014,893 Mar. 29, 1996.
[51] Int. Cl.$^6$ ...................................................... G06F 17/30
[52] U.S. Cl. ...................... 707/6; 707/3; 707/4; 345/346; 382/141; 382/305
[58] Field of Search ................................... 707/3, 7, 4, 6, 707/5; 345/346; 395/595, 580, 183; 382/141, 305

[56] References Cited

U.S. PATENT DOCUMENTS

| | | | |
|---|---|---|---|
| 4,672,683 | 6/1987 | Matsueda ..................................... | 707/5 |
| 5,148,522 | 9/1992 | Okazaki ....................................... | 707/6 |
| 5,515,453 | 5/1996 | Hennesey et al. ....................... | 382/141 |
| 5,579,471 | 11/1996 | Barber et al. ................................ | 707/6 |
| 5,729,704 | 3/1998 | Stope et al. .................................. | 707/4 |

OTHER PUBLICATIONS

A Cognitive Approach to Visual Interaction, T. Kato, et al., International Conference on Multimedia Information Systems '91, 1991, pp. 109–120.

Using Depicitive Queries to Search Pictorial Databases, S. Charles, et al., Interact '90 Proceedings of the IFIP TC 13 In: Human–Computer Interaction, 1990, pp. 493–498.

Ultimedia Manager: Professional Edition for OS/2 & DB2/2 brochure, IBM.

IBM Unleashes QBIC Image–Content Search, The Seybold Report on Desktop Publishing, Sep. 12, 1994, pp. 34–35.

Hands on Information: Visualizer Ultimedia Query for OS/2 brochure, IBM, 1994.

Database Architecture for Content–Based Image Retrieval, T. Kato, SPIE vol. 1662 Image Storage and Retrieval Systems, 1992, pp. 112–123.

*Primary Examiner*—Wayne Amsbury
*Assistant Examiner*—Thu-Thao Havan
*Attorney, Agent, or Firm*—Knobbe, Martens, Olson & Bear, LLP

[57] ABSTRACT

A system and method for content-based search and retrieval of visual objects. A base visual information retrieval (VIR) engine utilizes a set of universal primitives to operate on the visual objects. An extensible VIR engine allows custom, modular primitives to be defined and registered. A custom primitive addresses domain specific problems and can utilize any image understanding technique. Object attributes can be extracted over the entire image or over only a portion of the object. A schema is defined as a specific collection of primitives. A specific schema implies a specific set of visual features to be processed and a corresponding feature vector to be used for content-based similarity scoring. A primitive registration interface registers custom primitives and facilitates storing of an analysis function and a comparison function to a schema table. A heterogeneous comparison allows objects analyzed by different schemas to be compared if at least one primitive is in common between the schemas. A threshold-based comparison is utilized to improve performance of the VIR engine. A distance between two feature vectors is computed in any of the comparison processes so as to generate a similarity score.

14 Claims, 16 Drawing Sheets

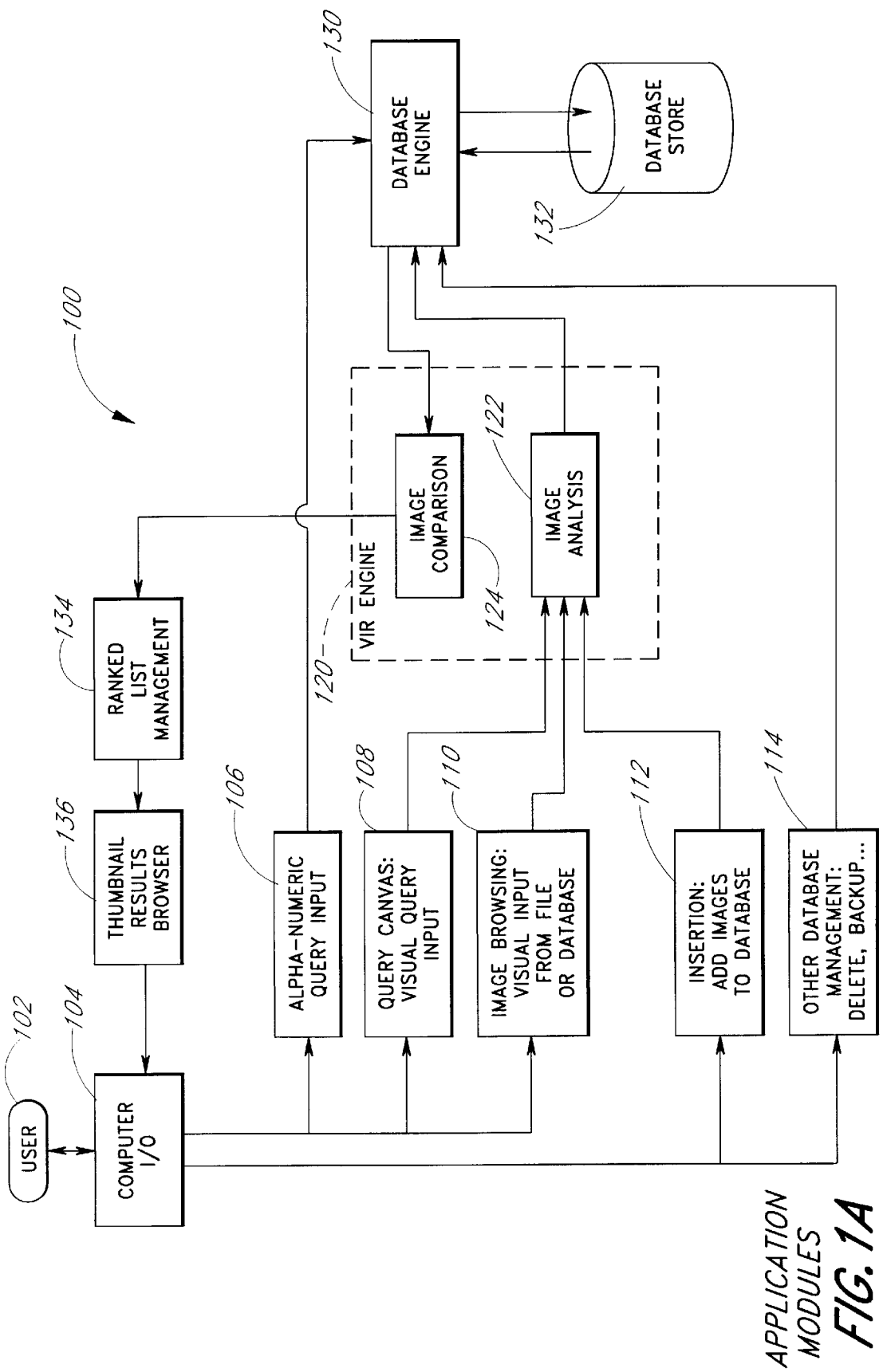

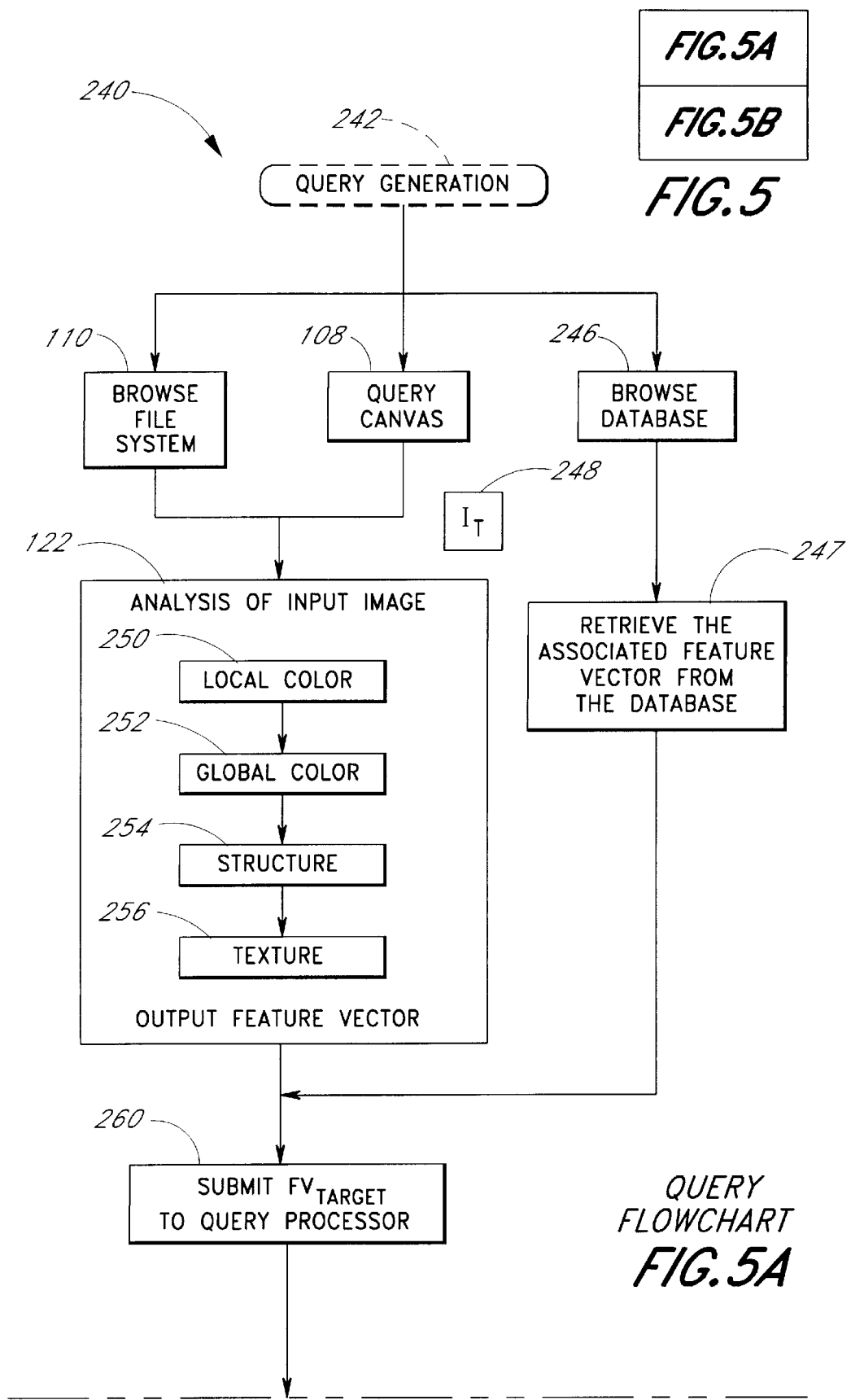

EXTENSIBLE VIR ENGINE

ANALYSIS

STANDARD COMPARISON

THRESHOLD COMPARISON

SCHEMA CREATION AND PRIMITIVE REGISTRATION

TOP "N" QUERY

SIMILARITY ENGINE FOR CONTENT-BASED RETRIEVAL OF IMAGES

RELATED APPLICATIONS

This application claims the benefit of the filing date of U.S. patent application Ser. No. 60/014,893, filed Mar. 29, 1996, for "SIMILARITY ENGINE FOR CONTENT-BASED RETRIEVAL OF OBJECTS", to Jain, et al.

MATERIAL SUBJECT TO COPYRIGHT PROTECTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to visual information retrieval systems. More specifically, the invention is directed to an extensible system for retrieval of stored visual objects based on similarity of content to a target visual object.

2. Description of the Related Technology

One of the most important technologies needed across many traditional and emerging applications is the management of visual information. Every day we are bombarded with information presented in the form of images. So important are images in our world of information technology, that we generate literally millions of images every day, and this number keeps escalating with advances in imaging, visualization, video, and computing technologies.

It would be impossible to cope with this explosion of image information, unless the images were organized for rapid retrieval on demand. A similar situation occurred in the past for numeric and other structured data, and led to the creation of computerized database management systems. In these systems, large amounts of data are organized into fields and important or key fields are used to index the databases making search very efficient. These information management systems have changed several aspects of the modern society. These systems, however, are limited by the fact that they work well only with numeric data and short alphanumeric strings. Since so much information is in non-alphanumeric form (such as images, video, speech), to deal with such information, researchers started exploring the design and implementation of visual databases. But creation of mere image repositories is of little value unless there are methods for fast retrieval of objects such as images based on their content, ideally with an efficiency that we find in today's databases. One should be able to search visual databases with visual-based queries, in addition to alphanumeric queries. The fundamental problem is that images, video and other similar data differ from numeric data and text in format, and hence they require a totally different technique of organization, indexing, and query processing. One needs to consider the issues in visual information management, rather than simply extending the existing database technology to deal with images. One must treat images as one of the central sources of information rather than as an appendix to the main database.

A few researchers have addressed problems in visual databases. Most of these efforts in visual databases, however, focussed either on only a small aspect of the problem, such as data structures or pictorial queries, or on a very narrow application, such as databases for pottery articles of a particular tribe. Other researchers have developed image processing shells which use several images. Clearly, visual information management systems encompass not only databases, but aspects of image processing and image understanding, very sophisticated interfaces, knowledge-based systems, compression and decompression of images. Moreover, memory management and organization issues start becoming much more serious than in the largest alphanumeric databases.

A significant event in the world of information systems in the past few years is the development of multimedia information systems. A multimedia information system goes beyond traditional database systems to incorporate various modes of non-textual digital data, such as digitized images and videos, in addition to textual information. It allows a user the same (or better) ease of use and flexibility of storage and access as traditional database systems. Today, thanks to an ever-increasing number of application areas like stock photography, medical imaging, digital video production, document imaging and so forth, gigabytes of image and video information are being produced every day. The need to handle this information has resulted in new technological requirements and challenges:

Image and video data are much more voluminous than text, and need supporting technology for rapid and efficient storage and retrieval.

There are several different modes in which a user would search for, view, and use images and videos.

Even if multimedia information resides on different computers or locations, it should easily be available to the user.

Thus, representation, storage, retrieval, visualization and distribution of multimedia information is now a central theme both in the academic community and industry alike. What is needed is a capability to manage this information. In traditional database systems, users search images by keywords or descriptions associated with the visual information. In a traditional database management system (DBMS), an image is treated as a file name, or the raw image data exists as a binary large object (BLOB). The limitation is clear: a file name or the raw image data is useful for displaying the image, but not for describing it. In some applications, these shortcomings were overcome by having a person participate in the process by interpreting and assigning keyword descriptions to images. However, textual descriptors such as a set of keywords are also inadequate to describe an image, simply because the same image might be described in different ways by different people. What is needed is a new multimedia information system technology model such as a visual information management system (VIMSYS) model. Unlike traditional database systems, this model recognizes that most users prefer to search image and video information by what the image or video actually contains, rather than by keywords or descriptions associated with the visual information. The only proper method by which the user can get access to the content of the image is by using image-analysis technology to extract the content from an image or video. Once extracted, the content represents most of what the user needs in order to organize, search, and locate necessary visual information.

This breakthrough concept of content extraction alleviates several technological problems. The foremost benefit is that it gives a user the power to retrieve visual information by asking a query like "Give me all pictures that look like this."

The system satisfies the query by comparing the content of the query picture with that of all target pictures in the database. This is called Query By Pictorial Example (QBPE), and is a simple form of content-based retrieval, a new paradigm in database management systems.

Over the last five years research and development in content-based retrieval of visual information has made significant progress. Academic research groups have developed techniques by which images and videos can be searched based on their color, texture, shape and motion characteristics. Commercial systems supporting this technology, such as Ultimedia Manager from IBM, and the Visual Intelligence Blade from Illustra Information Technologies, Inc. are beginning to emerge.

A typical content-based retrieval system might be described as follows: image features are precomputed during an image insertion phase. These representations may include characteristics such as local intensity histograms, edge histograms, region-based moments, spectral characteristics, and so forth. These features are then stored in a database as structured data. A typical query involves finding the images which are "visually similar" to a given candidate image. In order to submit a query, a user presents (or constructs) a candidate image. This query image may already have features associated with it (i.e., an image which already exists within the database), or may be novel, in which case a characterization is performed "on the fly" to generate features. Once the query image has been characterized, the query executes by comparing the features of the candidate image against those of other images in the database. The result of each comparison is a scalar score which indicates the degree of similarity. This score is then used to rank order the results of the query. This process can be extremely fast because image features are pre-computed during the insertion phase, and distance functions have been designed to be extremely efficient at query time. There are many variants on this general scheme, such as allowing the user to express queries directly at the feature level, combining images to form queries, querying over regions of interest, and so forth.

General systems (using color, shape, etc.) are adequate for applications with a broad image domain, such as generic stock photography. In general, however, these systems are not applicable to specific, constrained domains. It is not expected, for example, that a texture similarity measure that works well for nature photography will work equally well for mammography. If mammogram databases need to be searched by image content, one would need to develop specific features and similarity measures. This implies that a viable content-based image retrieval system will have to provide a mechanism to define arbitrary image domains and allow a user to query on a user-defined schema of image features and similarity metrics.

There is a need to provide a way to compare images represented by different schemas. There is also a need to reduce the time performing the comparison, especially when large numbers of images are in the database.

SUMMARY OF THE INVENTION

The above needs are satisfied by the present invention which is directed to a system and method for "content-based" image retrieval, a technique which explicitly manages image assets by directly representing their visual attributes. A visual information retrieval (VIR) Engine provides an open framework for building such a system. A visual feature is any property of an image that can be computed using computer-vision and image-processing techniques. Examples are hue, saturation, and intensity histograms; texture measures such as edge density, randomness, periodicity, and orientation; shape measures such as algebraic moments, turning angle histograms, and elongatedness. Some of these features are computed globally, i.e., over an entire image, and some are local, i.e., computed over a small region in the image. The VIR Engine expresses visual features as image "primitives". Primitives can be very general (such as color, shape, or texture) or quite domain specific (face recognition, cancer cell detection, etc.). The basic philosophy underlying this architecture is a transformation from the data-rich representation of explicit image pixels to a compact, semantic-rich representation of visually salient characteristics. In practice, the design of such primitives is non-trivial, and is driven by a number of conflicting real-world constraints (e.g., computation time vs. accuracy). The VIR Engine provides an open framework for developers to "plug-in" primitives to solve specific image management problems.

Various types of visual queries are supported by the VIR Engine as follows:

Query by image property, wherein a user specifies a property or attribute of the image, such as the arrangement of colors, or they may sketch an object and request the system to find images that contain similar properties. The Engine also allows the user to specify whether or not the location of the property in the image (e.g., blue at the bottom of the image or blue anywhere) is significant.

Query by image similarity, wherein a user provides an entire image as a query target and the system finds images that are visually similar.

Query refinement or systematic browsing, with any of the previous modes of query, the system produces some initial results. A browsing query is one that refines the query by either choosing an image from the previous result set, or by modifying the parameters of the original query in some way. The system in this situation reuses the previous results to generate refined results.

An important concept in content-based retrieval is to determine how similar two pictures are to one another. The notion of similarity (versus exact matching as in database systems) is appropriate for visual information because multiple pictures of the same scene will not necessarily "match," although they are identical in content. In the paradigm of content-based retrieval, pictures are not simply matched, but are ranked in order of their similarity to the query image. Another benefit is that content extraction results in very high information compression. The content of an image file may be expressed in as little as several hundred bytes of memory, regardless of the original image size. As an image is inserted into a VIMSYS database, the system extracts the content in terms of generic image properties such as its color, texture, shape and composition, and uses this information for all subsequent database operations. Except for display, the original image is not accessed. Naturally, the VIMSYS model also supports textual attributes as do all standard databases.

The VIR technology improves query success in many applications where images are collected, stored, retrieved, compared, distributed, or sold. Some applications for VIR technology include: managing digital images by stock photo agencies, photographers, ad agencies, publishers, libraries, and museums; managing digital video images for production houses and stock-footage providers; visually screening or comparing digital images in medicine and health care; searching files of facial images for law enforcement, credit card, or banking applications; satellite imaging; manufacturing test and inspection; manufacturing defect classification; and browsing an electronic catalog for on-line shopping.

In one aspect of the invention, there is a search engine, comprising a function container, a registration interface storing functions to the function container, and a primitive supplying primitive functions to the registration interface, wherein the primitive functions include a comparison function to compare visual objects.

In another aspect of the invention, there is a search engine, comprising a set of primitives capable of extracting attributes from a visual object, a registration interface capable of registering the primitives, and a comparator function capable of applying registered primitives so as to compare objects.

In yet another aspect of the invention, in a system comprising a search engine in communication with a database including a plurality of visual objects, a method of object comparison, comprising the steps of providing an analysis function and a comparison function for a custom primitive registering the custom primitive with the search engine, applying the analysis function to at least a portion of the database objects and a query object, and applying the comparison function to the analyzed query object and at least a portion of the analyzed database objects.

In another aspect of the invention, there is a method of extending a search engine for searching a database of visual objects, the method comprising the steps of providing a search engine primitive to extract an attribute from a visual object, and adding a new primitive to the search engine, wherein the new primitive comprises a comparison function for a selected attribute.

BRIEF DESCRIPTION OF THE DRAWINGS

The present invention will be described in further detail with reference to the accompanying drawings, in which:

FIG. 1A is a block diagram of the modules of one embodiment of a visual information retrieval (VIR) system.

FIGS. 5A and 5B are a high-level flow diagram showing the operation of the VIR system shown in FIG. 1A which includes the Base VIR Engine.

DETAILED DESCRIPTION OF THE PREFERRED EMBODIMENT

Figure 1B:
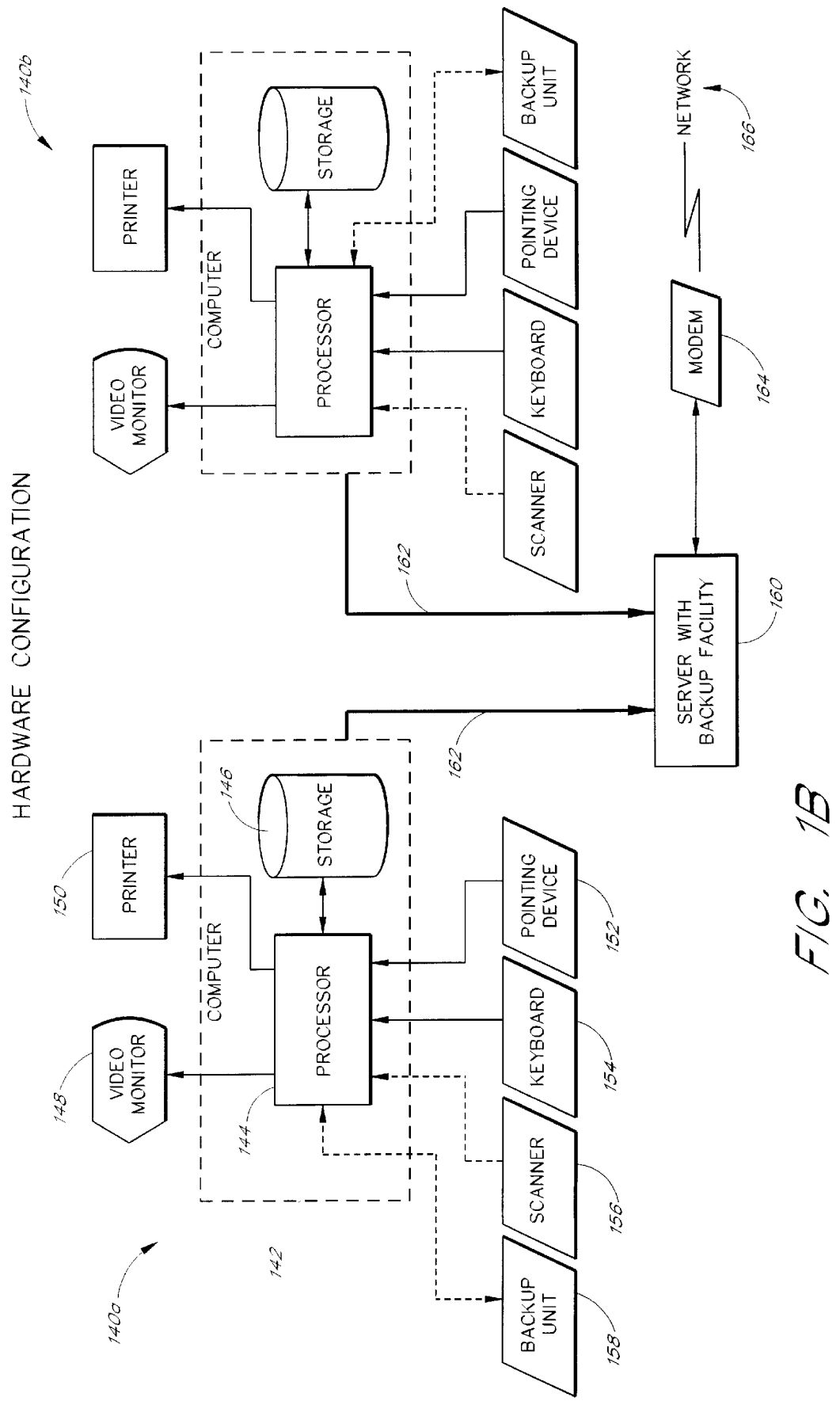
FIG. 1B is a block diagram of a hardware configuration for the VIR system of FIG. 1A.

The following detailed description of the preferred embodiment presents a description of certain specific embodiments of the present invention. However, the present invention can be embodied in a multitude of different ways as defined and covered by the claims. In this description, reference is made to the drawings wherein like parts are designated with like numerals throughout.

For convenience, the discussion of the preferred embodiment will be organized into the following principal sections: Introduction and Model, Base VIR Engine and System, Extensible VIR Engine and System, Applications, and Application Development.

I. INTRODUCTION AND MODEL

The VIR Engine is a library-based tool kit that is delivered in binary form (an object library with header file interfaces) on various platforms, and provides an American National Standards Institute (ANSI) "C" language interface to the application developer. It provides access to the technology of Visual Information Retrieval (VIR), which allows images to be mathematically characterized and compared to one another on the basis of "visual similarity". Applications may now search for images or rank them based on "what they look like". The VIR Engine looks at the pixel data in the images, and analyzes the data with respect to visual attributes such as color, texture, shape, and structure. These visual attributes are called "primitives", and the image characterization is built up from these. Images which have been analyzed may then be compared mathematically to determine their similarity value or "score". Images are analyzed once, and the primitive data is then used for fast comparisons.

A first embodiment of the invention provides a "Base VIR Engine API" which has a fixed set of visual primitives, and the necessary calls for analyzing and comparing images. A second embodiment of the invention provides an "Extensible VIR Engine API" which allows application developers the ability to create new visual primitives for specialized, vertical applications. This enables application developers to capture higher level semantic information about the images being analyzed, and create intelligent applications in specific domains.

The main functions of the Base Engine application programming interface (API) are: initialization and global definitions, image analysis functions, similarity comparison functions, scoring functions, and weights management. In addition to the functionality of the Base Engine, the Extensible Engine API also has primitive registration and schema management. The entry points for these functions are defined in regular "C" header files.

The VIR Engine has a "stateless" architecture in which all of the data about images is managed and stored by the application. Applications are responsible for passing "raw" image data (e.g., red, green, blue (RGB) format buffers) into the engine, and then handling the feature data and scoring information that is returned to the application by the Engine.

When a comparison is desired, the application passes the feature data for a pair of images back to the Engine to obtain a final score. Thus, all persistent data management, query set management, and similar activities, are the responsibility of the application developer. The Engine makes no assumptions about storage methodologies, formats, list management, or any information structures that require state information.

Similarity scoring is a comparison of images based on a conceptual "feature space", where each image is a "point" in this space. The similarity score is a number that represents the abstract distance between two given images in this space. Each visual primitive provides a component of the overall similarity score; that is, each primitive provides its own multi-dimensional feature space. An overall visual similarity score is provided by combining the primitive scores in a way that is visually meaningful. This is both application and user dependent; therefore the Engine allows the application to pass in a set of weightings that define the "importance" of each primitive in computing the overall score. In the presently preferred embodiment, the scores are normalized in the range [0 . . . 100].

The Virage Model of Visual Information

Following the aforementioned VIMSYS data model for visual information, Virage technology admits four layers of information abstraction: the raw image (the Image Representation Layer), the processed image (the Image Object Layer), the user's features of interest (called the Domain Object Layer) and the user's events of interest for videos or other collections of sequenced images (the Domain Event Layer). The top three layers form the content of the image or video. A discussion of representing the abstracted information by data types follows. The data types pertain to the top three layers of the model.

Data Types

A content-based information retrieval system creates an abstraction of the raw information in the form of features, and then operates only at the level of the abstracted information. In general, data types and representation issues are only constrained by the language used for an implementation.

One presently preferred implementation is as follows. For visual information, features may belong to five abstract data types: values, distributions, indexed values, indexed distributions, and graphs. A value is, in the general case, a set of vectors that may represent some global property of the image. The global color of an image, for example, can be a vector of RGB values, while the dominant colors of an image can be defined as the set of k most frequent RGB vectors in an image. A distribution, such as a color histogram is typically defined on an n-dimensional space which has been partitioned into b buckets. Thus, it is a b-dimensional vector. An indexed value is a value local to a region of an image or a time point in a video or both; as a data type it is an indexed set of vectors. The index can be one-dimensional as in the key-frame number for a video, or it can be multi-dimensional as in the orthonormal bounding box coordinates covering an image segment. An indexed distribution is a local pattern such as the intensity profile of a region of interest, and can be derived from a collection of b-dimensional vectors by introducing an index. A graph represents relational information, such as the relative spatial position of two regions of interest in an image. We do not consider a graph as a primary type of interest, because it can be implemented in terms of the other four data types, with some application-dependent rules of interpretation (e.g. transitivity of spatial predicates, such as left-of).

It follows from the foregoing discussion that vectors form a uniform base type for features representing image content. In a presently preferred embodiment, the primary data type in the VIR Engine is a (indexable) collection of feature vectors (FVs).

Primitives

Image objects have computable image properties or attributes that can be localized in the spatial domain (arrangement of color), the frequency domain (sharp edge fragments), or by statistical methods (random texture). These computed features are called primitives. Primitives are either global, computed over an entire image, or local, computed over smaller regions of the image. For each generic image property such as color, texture, and shape, a number of primitives may be computed. Besides this conceptual definition of a primitive, the specific implementation may also be referred to as a primitive. For instance, the collection of functions to extract and compare an image attribute may be referred to as a primitive.

Distance Metrics

Since primitives are extracted by different computational processes, they belong to different topological spaces, each having different distance metrics defined for them. Computationally, these metrics are designed to be robust to small perturbations in the input data. Because the abstracted image primitives are defined in topological spaces, searching for similarity in any image property corresponds to finding a (partial) rank order of distances between a query primitive and other primitives in that same space. Also, since the space of image properties is essentially multidimensional, several different primitives are necessary to express the content of an image. This implies that individual distance metrics need to be combined into a composite metric using a method of weighted contributions.

Primitive Weighting

The overall similarity between two images lies literally "in the eye of the beholder." In other words, the perceptual distance between images is not computable in terms of topological metrics. The same user will also change his or her interpretation of similarity depending on the task at hand. To express this subjective element, the VIR interface provides functions to allow the user to control which relative combinations of individual distances satisfies his or her needs. As the user changes the relative importance of primitives by adjusting a set of weighting factors (at query time), the VIR system incorporates the weight values into the similarity computation between feature vectors.

The information model described above is central to the system architecture. All other aspects such as the keywords associated with images, the exact nature of data management and so forth are somewhat secondary and depend on the application environments in which the technology is used. The software aspects of this core technology are explained hereinbelow. An explanation of the different environments in which the core model is embedded also follows.

II. THE BASE VIR ENGINE AND SYSTEM

The VIR system technology is built around a core module called the VIR Engine and operates at the Image Object Level of the VIMSYS model. There are three main functional parts of the Engine: Image Analysis, Image Comparison, and Management. These are invoked by an application developer. Typically, an application developer accesses them during image insertion, image query, and image requery (a query with the same image but with a different set of weighting factors). The function of each unit, and how the application developer uses the VIR Application Programming Interface (API) to exchange information with the VIR Engine is described below. The full capabilities of the Engine are decomposed into two API sets: a Base VIR Engine, and an Extensible VIR Engine. The Base Engine provides a fixed set of primitives (color, texture, structure, etc.) while the Extensible Engine provides a set of mechanisms for defining and installing new primitives (discussed in detail later).

Base System Modules

Referring to FIG. 1A, the modules of an embodiment of a visual information retrieval (VIR) system 100 that utilizes the Base VIR Engine 120 will be described. A user 102 communicates with the system 100 by use of computer input/output 104. The computer I/O 104 will be further described in conjunction with FIG. 1B. The user 102 initiates one of several modules or functions 106–114 that output to either the VIR Engine 120 or a database engine 130. The database engine 130 can be one of the many commercially available database engines available on the market, such as available from Informix Software, Inc., or IBM DB2.

Figure 3:
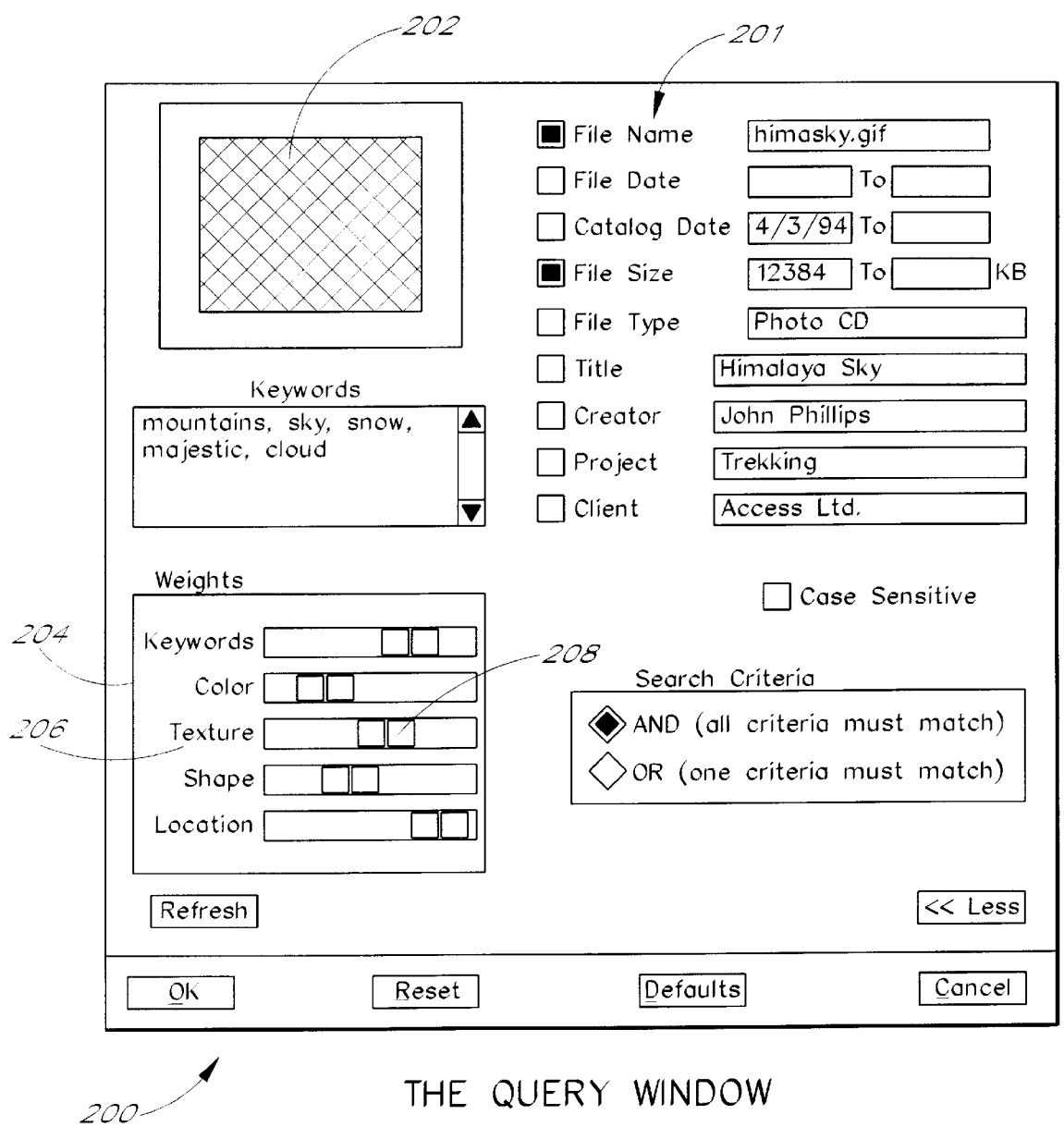
FIG. 3 is an exemplary screen display sees during execution of the alphanumeric query input module 106, or subsequent to execution of the query canvas module 108 or image browsing module 110 shown in FIG. 1A.

An "Alpha-numeric query input" module 106 allows the user to specify a target object by alpha-numeric attributes, such as shown in an exemplary Query Window screen of FIG. 3. The output of this module bypasses the VIR Engine 120 and is used as a direct input to the database engine 130.

A "Query Canvas" module 108 provides a visual query input to the VIR Engine 120. The Query Canvas module 108 will be further described in conjunction with FIG. 2.

An "Image Browsing" module 110 provides a visual input, such as an image from a file or database accessible to the user 102. The file or database may be on the user's computer, such as on a hard drive, CD-ROM, digital video/versatile disk (DVD) drive, tape cartridge, ZIP media, or other backup media, or accessible through a network, such as a local area network (LAN), a wide area network (WAN) or the Internet. The visual input is provided to the VIR Engine 120. An "Insertion" module 112 is used to provide one or more new images to be added to a database 132 accessible by the database engine 130. The new image(s) are provided as inputs to the VIR Engine 120. Note that references to the database 132 may be to a portion or a partition of the entire database, such as, for example visual objects associated with a particular domain. Therefore, visual objects for multiple domains or subsets of a domain could be stored in separate databases or they may be stored in one database.

An "Other Database Management" module 114 is used to initiate standard database operations on database 132. Module 114 communicates directly with the database engine 130.

Figure 5B:
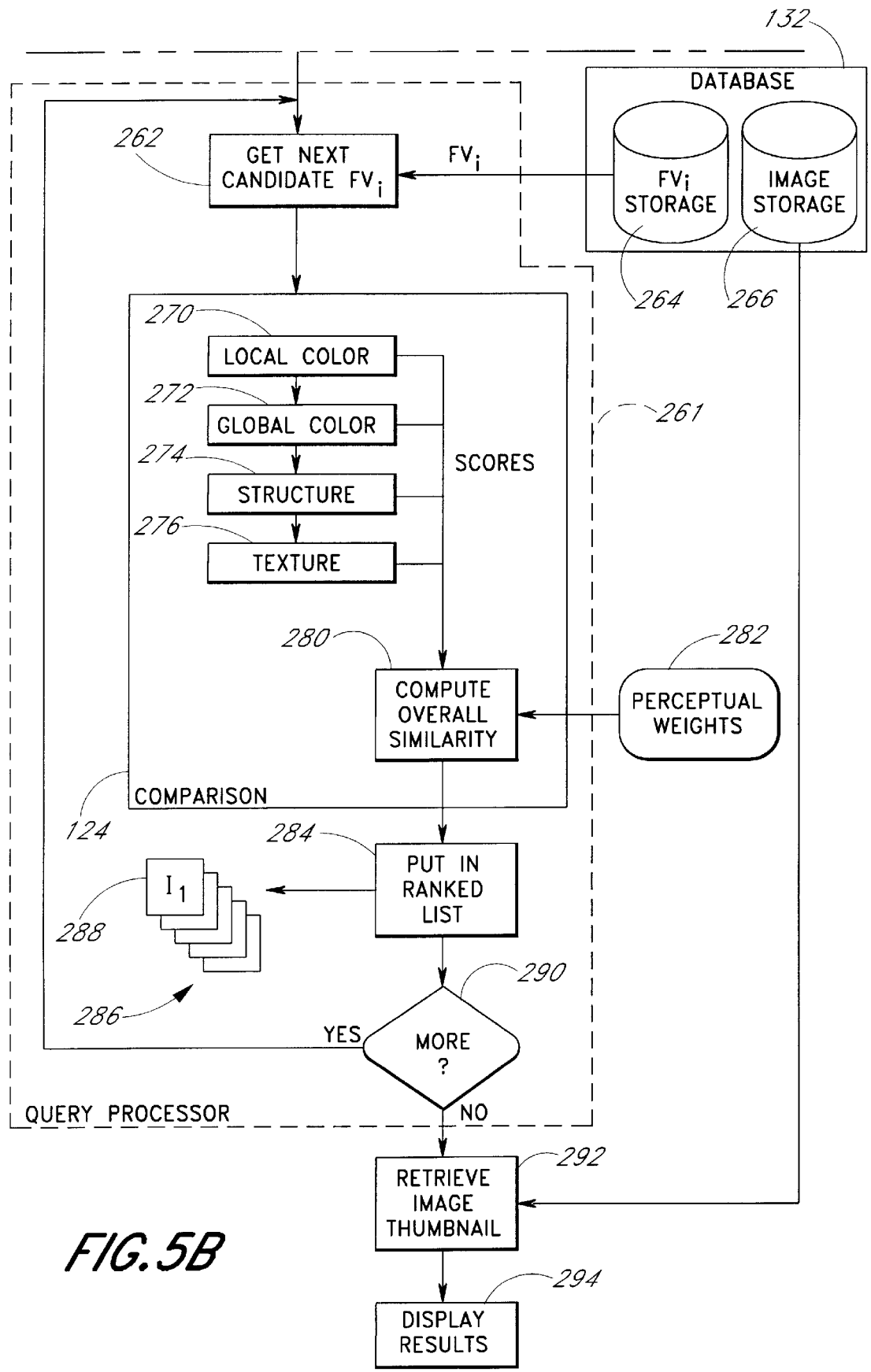

The VIR Engine 120 comprises two main modules: an "Image Analysis" module 122 and an "Image Comparison" module 124. The image analysis module 122 receives inputs from either module 108 or 110 to generate a query target or from the insertion module 112 for adding a new image into the database 132. The output of the image analysis module 122 is a feature vector (FV) that describes the visual object passed to it by one of modules 108, 110 or 112. The FV is passed on to the database engine 130. In addition, if module 112 was used to insert the image into the database, both the FV for the image and the image itself are stored in the database 132 (as seen in FIG. 5B). The image analysis module 122 will be described in greater detail hereinbelow.

Figure 4:
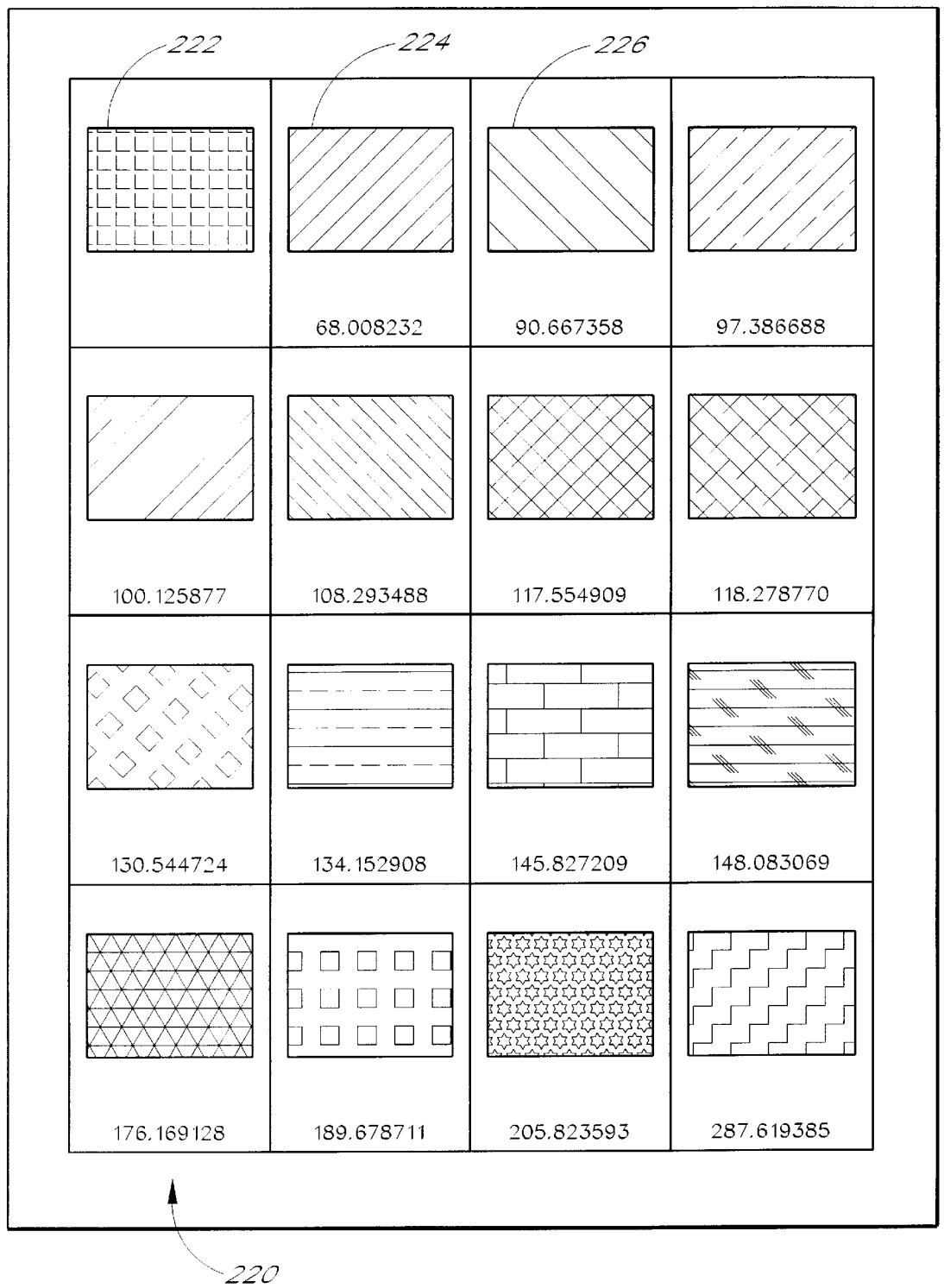
FIG. 4 is an exemplary screen display seen while executing the thumbnail results browser 136 shown in FIG. 1A.

The image comparison module 124 receives a query target FV and a FV for the image being tested or compared from the database engine 130. The output of the image comparison module 124 is a similarity score that is sent to a "Ranked List Management" module 134. A plurality of images from the database 132 are compared one at a time to the query image by the image comparison module 124. The resultant similarity scores are accumulated by the module 134 so as to provide a rank in an order of their similarity to the query image. The ranked results of the list management module 134 are provided to a "Thumbnail Results Browser" 136 for display to the user 102 through the computer I/O 104. An exemplary screen display of ranked results is shown in FIG. 4.

Referring now to FIG. 1B, a hardware configuration for the VIR system of FIG. 1A will be described. A computer or workstation 140a communicates with a server 160 by a network 162, such as a local area network (LAN) or wide area network (WAN). One or more additional computers or workstations 140b can be connected to the server 160 by the network 162. The computers 140a and 140b can be a personal computer, such as utilizing an Intel microprocessor chip (at minimum, a 80486 model) or a Motorola PowerPC chip, or a workstation utilizing a DEC Alpha chip, a SPARC chip, a MIPS chip, or other similar processor 144. A computer enclosure 142 contains the processor 144, a storage device 146 connected to the processor 134 preferably of at least 1–2 Gigabytes, and a memory of at least 32 Megabytes (not shown). Connected to the processor 144 are a plurality of I/O devices 104 (FIG. 1A) including a visual monitor 148, a printer 150, a pointing device (such as a mouse, trackball or joystick) 152, and a keyboard 154. Optional I/O devices include a scanner 154 and a backup unit 158. The server 160 typically has similar or greater processing power than the computers 140a and 140b but typically has a larger capacity storage device and memory. The server 160 also has a backup facility to safeguard the programs and data. The server 160 may be connected to remote computers similar to computer 140a by a modem 164 to another network 166, which may be a WAN or the Internet for example.

The present invention is not limited to a particular computer configuration. The hardware configuration described above is one of many possible configurations. Other types of computers, server and networks may be utilized.

In one embodiment of the system 100, the modules shown in FIG. 1A may all be physically located on one computer 140a. In another embodiment of system 100, the computer I/O 104, and modules 106–114 and 134–136 could be located on computer 140a, while the VIR Engine 120, the database engine 130 and the database store 132 could all be located on the server 160. In yet another embodiment of system 100 that is similar to the previous embodiment, the VIR Engine 120 could be on server 160 and the database engine 130 and the database store 132 could be located on another server (not shown) on the network 160. Other combinations of the above modules are also possible in yet other embodiments of the system 100. Furthermore, individual modules may be partitioned across computing devices.

Query Canvas

Figure 2:
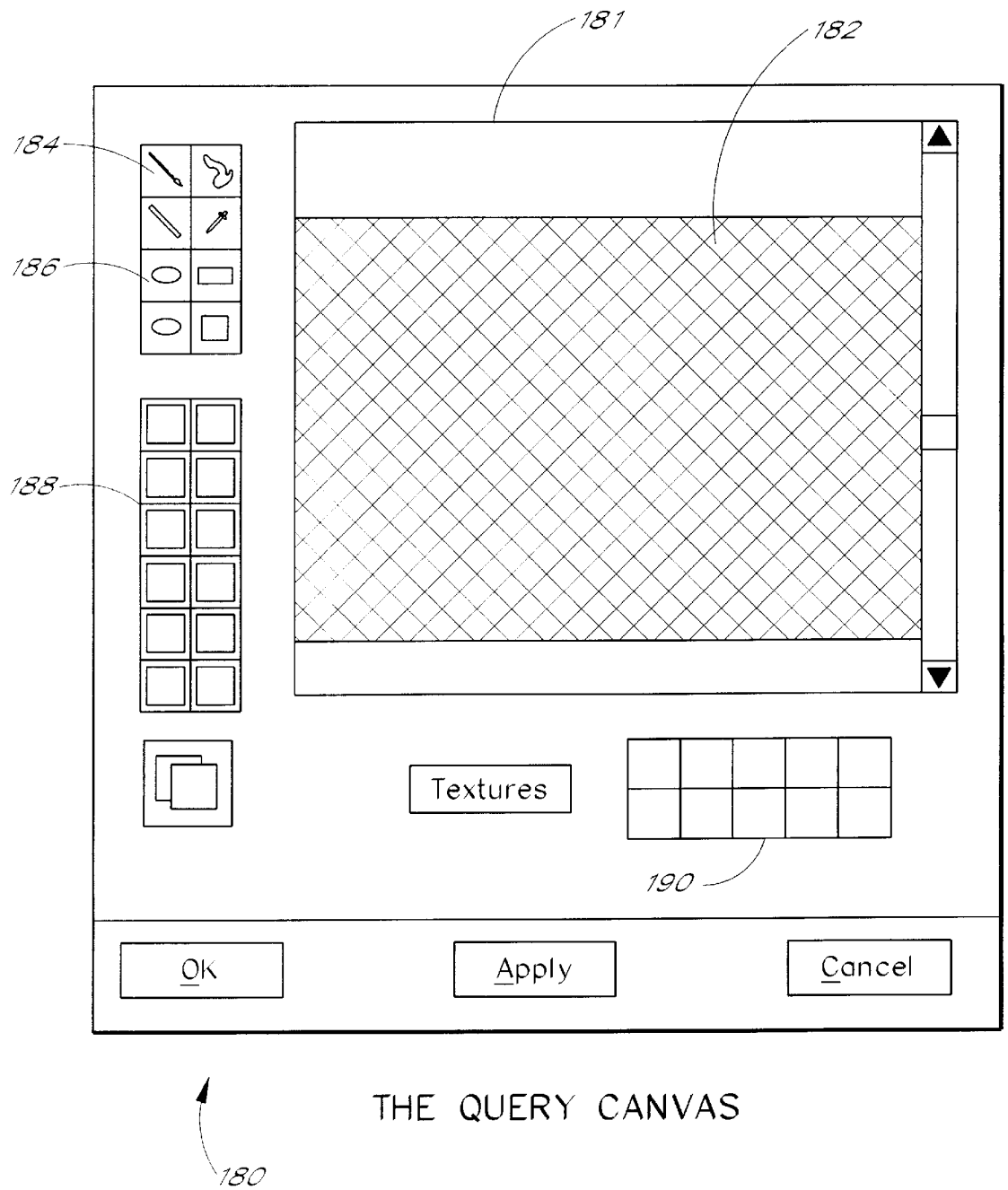
FIG. 2 is an exemplary screen display seen while executing the query canvas module 108 shown in FIG. 1A.

Referring to FIG. 2, an exemplary screen display 180 of the Query Canvas module 108 will be described. The Query Canvas is a specific user-interface mechanism that is an enhancement to the query specification environment. The Query Canvas provides a bitmap editor to express the query visually, and serves as an input to the Image Analysis module 122 (FIG. 1A). The canvas may begin as a blank slate in a canvas window 181, or may have an existing image pre-loaded into it (drag and drop an image from an existing image collection) prior to modification with a set of painting/drawing tools. These tools include, for example, standard brushes 184, pens, region fills, a magic wand to define regions, ovals 186, rectangles, lines, and so forth. A color palette 188 is provided, with the ability to define new colors from a color chooser. A palette of textures 190 is also provided, with the ability to select new textures from a large library.

Once an image, such as image 182, has been created, it can be submitted as a query to the system. The Query Canvas tool saves the user significant initial browsing time in those cases where he or she already has an idea of what the target images should look like. Since the query canvas allows modification of images, it encompasses the functionality of the "query-by-sketch" paradigm.

Of course, one will recognize that the present invention is not limited to any particular type of query creation.

Query Window

Referring to FIG. 3, an exemplary screen display 200 of a Query Window will be described. The Query Window or form 200 is provided to specify alpha-numeric information 201 such as keywords, dates, file name masks, project or client names, and so forth. The Query Window 200 also shows an iconic image 202 of the current contents of the Query Canvas 108 (FIG. 1A) which expresses the visual component of the query.

However, the most important aspect of the Query Window 200 are the sliders (such as slider 208) to control the relative importance or weights 204 for the visual and textual aspects of the query. There are sliders to indicate the importance of visual query attributes such as Color, Texture 206, Shape, Location, and textual query attributes such as Keywords. The ability to select perceptual weights of attributes is a critical aspect of the visual query over which the user has control. Of course, other attributes and ways selecting weights are encompassed by the present invention.

Query Results

Referring to FIG. 4, an exemplary screen display 220 of Query Results will be described. The Query Results 220 are displayed to the user 102 by the thumbnail results browser 136 (FIG. 1A). A thumbnail (reduced size) image 222 of the query image is preferably shown in the upper left corner of the visual display 148 (FIG. 1B). A thumbnail 224 of the image that has the best similarity score, indicative of the closest match to the query image, is shown to the right of the query image 222. A thumbnail 226 of the image having the second best similarity score is shown to the right of image 224, and so forth for a predetermined number of thumbnail images shown to the user 102. A mechanism (not shown) to access a next screen of ranked thumbnails is available. The similarity score of each of the ranked images may be optionally shown in conjunction with the thumbnails. Of course, the present invention is not limited to the particular presentation of search results.

Operational Flow of Base VIR System

Referring to FIGS. 5A and 5B, a high-level flow diagram showing the operation 240 of the VIR system 100, including the Base VIR Engine 120, will be described. The user 102 (FIG. 1A) preferably initiates query generation 242 by either utilizing the query canvas 108 to create a query, or browses 110 the available file system to locate an existing object to use as the query, or browses 246 the database store 132 (FIG. 1A and FIG. 5B) to identify an image that has already been analyzed by the analysis module 122. In the last situation, if the image is already in the database 132, a feature vector has been computed and is retrieved at state 247 from a feature vector storage portion 264 of the database 132. A target image $I_T$ 248 results if either of the query canvas module 108 or browse file system module 110 are used to generate a query. The target image 248 is input to the analysis module 122 to generate a feature vector for the target image as the output. Because of the importance of the primitives in the system 100, a digression is now made to describe the base system primitives.

Default Primitives

The Base VIR Engine 120 has a fixed or default set of primitives. Primitives and their weights are identified and indicated using a tagging mechanism to identify them in the API calls. The default primitives of the presently preferred Base Engine are:

Local Color (250): analyzes localized color and the spatial match-up of color between two images.

Global Color (252): considers both the dominant color and the variation of color throughout the entire image.

Structure (254): determines large scale structure in the image as represented mainly by edges with strong matching for the location and orientation of edge features.

Texture (256): analyzes areas for periodicity, randomness, and roughness (smoothness) of fine-grained textures in images.

Image Analysis

Returning now to the analysis module 122, the analysis function performs several preprocessing operations, such as smoothing and contrast enhancement, to make the image ready for different primitive-extraction routines. Each primitive-extraction routine takes a preprocessed image, and, depending on the properties of the image, computes a specific set of data, called feature data, for that primitive. Feature data is data that typically represents some image feature that is extracted by one primitive. The feature data typically is a mathematical characterization of the visual feature. A feature vector is a concatenation of a set of feature data elements corresponding to a set of primitives in a schema (further described hereinbelow). The feature vector preferably has header information that maps the feature data contained within it.

When the analysis module 122 is utilized to insert images into the database 132, the feature vector of the computed primitive data is stored in a data structure 264. In essence, the application provides a raw image buffer to the VIR Engine, and the Engine returns a pointer to a set of data containing the extracted primitive data. The application is then responsible for storing and managing the data in a persistent fashion. The VIR Engine 120 operates in a "stateless" fashion, which means it has no knowledge of how the image data is organized and stored, or how the results of queries are managed. There is no transaction management at the Engine API level. This property means that system developers and integrators need not worry about conflicts between the VIR Engine and other application components such as databases, client-server middleware, and so forth.

Proceeding to state 260 of FIG. 5A, the feature vector of the query target is submitted to a Query Processor 261 (FIG. 5B). The Query Processor 261 obtains a candidate feature vector for an image "i" from feature vector storage 264 (part of database 132). The feature vector of the query target ($FV_{TARGET}$) and the candidate feature vector ($FV_i$) are then both submitted to the comparison module 124.

Comparisons

There are several ways to compare images using the API. Each method involves computing one or more similarity distances for a pair of primitive vectors. The computation of the similarity distance is performed in two steps. First, for each primitive such as local color 270, global color 272, structure 274 or texture 276, a similarity distance (score) is computed. Similarity scores for primitives are further discussed in conjunction with FIG. 11. These scores ($s_i$) are then combined at state 280 with weights ($w_i$) 282 by a judiciously chosen function that forms a final score. The final combined score may, for instance, be generated by a linear combination or a weighted sum as follows:

$$s_f = \sum_i w_i s_i$$

The final score is used to rank results 286 at state 284 by similarity. An image 288 with the best score (the lowest score in the presently preferred embodiment) is ranked at the closest match. Of course, the definition of "similarity" at this point is determined by the set of weights 282 used.

Applications may also synthesize a property weighting (such as "composition") by intelligently applying weights during comparisons. If "composition" is weighted low, then global primitives should be emphasized; if it is weighted high, then local primitives should be emphasized.

Decision state 290 determines if there are more images in the database 132 that need to be evaluated by the comparison module 124. If so, the Query Processor continues at state 262 by obtaining the next candidate feature vector. If all the candidate images in the database 132 have been evaluated, processing advances to state 292 wherein the thumbnails corresponding to a predetermined number of ranked thumbnails are retrieved from the image storage portion 266 of database 132 and are displayed to the user at state 294.

Management

There are several supporting functions that fall in the category of "management." These include initialization, allocation and de-allocation of weights and scores structures, and management of primitive vector data.

III. THE EXTENSIBLE VIR ENGINE AND SYSTEM

The Extensible VIR Engine introduces the notion of a "schema". A schema is a specific collection of primitives (default and/or application-specific) which are used in an application for the purpose of comparing images. When a group of primitives are registered, the system returns a schema ID to be used for future reference when creating weights and scores structures.

The Extensible VIR Engine is an open, portable and extensible architecture to incorporate any domain specific information schema. The Extensible VIR Engine architecture can be extended not only across application domains, but across multiple media such as audio, video, and multi-dimensional information.

The purpose of the Extensible Engine is to provide to the application developer the flexibility of creating and adding custom-made primitives to the system. For example, a face-matching system might construct primitives called "LeftEye" and "RightEye", and provide an interface that compares faces based on the similarity of their eyes.

Developer-Defined Primitives

In terms of the VIR Engine, a collection of vectors representing a single category of image information is a primitive. A primitive is a semantically meaningful feature of an image. Thus color, texture, and shape are all general image primitives. Of course, not all primitives will be applicable across all images. For instance, a color primitive may have no relevance with respect to X-ray imagery. In practice, a primitive is specified by a developer as a 6-tuple of the following values:

Static information primitive_id—a unique primitive identifier label—a category name for the primitive Data retrieval functions analysis_function—This function essentially accepts the image data and computes its visual feature data and stores it in a buffer. The function must accept an RGB image buffer, its attributes (height, width) and based on this information, perform any desired computation on the pixel data in the buffer. The results of this computation (i.e., feature computation) can be anything. The primitive decides what it wants to return as the feature data. The feature data is returned by passing back a pointer to the data and a byte count telling the VIR Engine how much data is there. The Engine then takes the data and adds it to the vector being constructed.

compare_function—This function returns the similarity score for its associated primitive. The query operations of the engine call this function with two data buffers (previously created with analysis_function ( )) to be compared. The score which is returned is preferably in the range from [0.0 . . . 100.0], wherein a "perfect" match returns a value of zero and a "worst" match returns a value of 100. The score is best considered to be a "distance" in "feature space". For maximum discrimination, the spectrum of distances returned for this primitive should be spread over this range evenly or in a reasonably smooth distribution.

Data management functions swap_function—The engine takes full responsibility for handling the byte order difference between hardware platforms for easy portability. This allows data that is computed on a certain platform to be easily used on any other platform, regardless of byte-order differences. Each primitive supplies this function which will do the byte-order conversions of its own data. The engine will automatically use this function when necessary, to provide consistent performance across any platform.

print_function—This function is used to print out the desired information of the associated primitive.

After a primitive is defined, it is registered with the Extensible VIR Engine using the RegisterPrimitive( ) function. Once registered, data associated with a custom primitive is managed in the visual feature structures in the same manner as the default primitives. From there, the new primitive can be incorporated into any schema definition by referencing the primitive_id just like a built-in (default) primitive. Application developers may define any type of data structure(s) to handle the data associated with their primitive. It is preferably required that the structure(s) can collapse into a BLOB to be passed back and forth via the registered procedures. In addition to the above primitive information, an estimated cost of comparison may also be supplied for the primitive, to aid in query optimization performed by the engine.

In another implementation of the present inventive extensible search engine, a primitive may be defined in an object-oriented language such as, for example, C++. In an object-oriented language, an object is defined to include data and methods for operating on the data. One text for C++ programming, *C++ Primer by* Stanley Lippman, Second Edition, Addison-Wesley, is incorporated herein by reference.

Objects are created from classes defined by the author of an API. The base class may then be subclassed to provide a specific primitive, a color primitive for instance. The API author will then overload, say, a compare function and an analysis function. Thus, an extended primitive is added to the engine by object-oriented subclassing and function (or method) overloading. Such an embodiment will be understood by one of skill in the relevant field of technology.

More specifically, abstract C++ classes using pure, virtual functions may define the interface. Furthermore, the object-oriented system implementation could follow the Object Management Group (OMG) standards. Presently, OMG is working on an Object Query Service standard which is defined by Object Services Architecture (Revision 6.0), which is incorporated by reference. Further information on object-oriented database standards can be found in *The Object Database Standard: ODMG* 93, edited by Cattell, Morgan Kaufman Publishers, which is incorporated herein by reference.

Schema Definition

Databases require a consistent structure, termed a schema, to organize and manage the information. As used herein, in particular, a schema is a specific collection of primitives. A specific schema implies a specific set of visual features to be processed and a corresponding feature vector to be used for content-based similarity scoring. A VIR Engine schema is defined as a 2-tuple: a schema id, and an ordered set of primitives. Similar to primitives, the Extensible VIR Engine is notified of a new schema by a RegisterSchema( ) function. The primitive IDs referenced here must have previously been defined using RegisterPrimitive( ), or must be one of the default primitives. The order in which the primitives are referenced dictates the order in which their functions are called during feature extraction (but not during query processing). This allows primitives to work synergistically and share computational results. A single application is allowed to define and use multiple schemas. The Extensible VIR Engine operates as a stateless machine and therefore does not manage the data. Hence the calling application manages the storage and access of the primitive data computed from any schema. The application developer must manage the schema_id that is returned from the registration. Preferably, the schema itself is expressed as a NULL-terminated array of unsigned 32-bit integers, each containing the ID of the desired primitive. The primitive IDs referenced here must have previously been defined using RegisterPrimitive, or must be one of the default primitives.

Primitive Design

The "pistons" of the VIR Engine are the primitives. A primitive encompasses a given feature's representation, extraction, and comparison function. There are a number of heuristics which lead to effective primitive design. These design constraints are not hard rules imposed by the Engine architecture, but rather goals that lead to primitive which are "well-behaved". For a given application, an engineer may choose to intentionally relax certain constraints in order to best accommodate the tradeoffs associated with that domain. The constraints are as follows:

meaningful—Primitives should encode information which will be meaningful to the end-users of the system. Primitives, in general, map to cognitively relevant image properties of the given domain.

compact—A primitive should be represented with the minimal amount of storage.

efficient in computation—Feature extraction should not require an unreasonable amount of time or resources.

efficient in comparison—Comparison of features should be extremely efficient. The formulation should take advantage of a threshold parameter (when available), and avoid extraneous processing once this threshold has been exceeded. The distance function should return results with a meaningfully dynamic range.

accurate—The computed data and the associated similarity metric must give reasonable and expected results for comparisons.

indexable—The primitive should be indexable. A secondary data structure should be able to use some associated value(s) for efficient access to the desired data.

In addition, primitives can provide their own "back door" API's to the application developer, and expose parameters that are controlled independently from the weights interface of the VIR Engine. There is also ample opportunity for a set of domain primitives to cooperate through shared data structures and procedures (or objects) in such a way that they can economize certain computations and information.

The primitives include a mechanism called "primitive extensions" for enriching the API. This allows the application greater control over the behavior of the primitives and the results of comparisons. For example, a texture primitive may expose a set of weights for sub-components of texture such as periodicity, randomness, roughness, and orientation. These parameters would be specialized and independent of the main texture weight passed through the Compare module entry points.

Universal Primitives

Several "universal" or default primitives are included with the Base VIR Engine. These primitives are universal in the sense that they encode features which are present in most images, and useful in a wide class of domain-independent applications. Each of these primitives are computed using only the original data of the image. There is no manual intervention required to compute any of these primitives. A developer can choose to mix-and-match these primitives in conjunction with domain specific primitives to build an application. These primitives have been designed based on the above heuristics.

Global color—This primitive represents the distribution of colors within the entire image. This distribution also includes the amounts of each color in the image. However, there is no information representing the locations of the colors within the image.

Local color—This primitive also represents the colors which are present in the image, but unlike Global color, it emphasizes where in the image the colors exist.

Structure—This primitive is used to capture the shapes which appear in the image. Because of problems such as lighting effects and occlusion, it relies heavily on shape characterization techniques, rather than local shape segmentation methods.

Texture—This primitive represents the low level textures and patterns within the image. Unlike the Structure primitive, it is very sensitive to high-frequency features within the image.

Domain Specific Primitives

Applications with relatively narrow image domains can register domain specific primitives to improve the retrieval capability of the system. For applications such as retinal imaging, satellite imaging, wafer inspection, etc., the development of primitives that encode significant domain knowledge can result in powerful systems. Primitives should obey the design constraints listed above, but there is considerable flexibility in this. For example, a wafer inspection primitive may be designed to look for a specific type of defect. Instead of an actual distance being returned from the distance function, it can return 0.0 if it detects the defect, and 100.0 if not.

Analysis

Before an application can determine the similarity between an image description and a set of candidate images, the images must be analyzed by the engine. The resulting feature data is returned to the caller to be used in subsequent operations. Naturally, if an image is to be a candidate image in future operations, the feature vector should be stored in a persistent manner, to avoid re-analyzing the image.

> analyze_image—This function accepts a memory buffer containing the original image data. It performs an analysis on the image by invoking the analysis functions of each primitive. The results of this computation are placed in memory and returned to the caller, along with the size of the data. Maintenance and persistent storage of this data is the caller's responsibility. Eventually, these structures are passed into the image comparison entry points.
>
> destroy_features—this function is used to free the memory associated with a visual feature that was previously returned from analyze_image( ). Typically, this is called after the application has stored the data using the associated persistent storage mechanism.

Similarity/Scores

Any image retrieval application requires the ability to determine the similarity between the query description and any of the candidate images. The application can then display the computed similarity value of all of the candidate images, or convey only the most similar images to the user. To do this, similarity scores are computed by the engine for the relevant candidate images. An application will call the comparison functions provided by the engine. These functions will return a score structure, which indicates the similarity between the images being compared. The score structure contains an overall numerical value for the similarity of the two images, as well as a numerical value for each of the primitives in the current schema. This allows applications to use the values of the individual primitive comparisons, if necessary.

When two images are compared by the engine, each of the primitives in the current schema are compared to give individual similarity values for that primitive type. Each of these scores must then be used to provide an overall score for the comparison. In certain situations, these individual primitive scores may need to be combined differently, depending on the desired results. By altering the ways these individual scores are combined, the application developer has the ability to indicate relative importance between the various primitives. For example, at times the color distribution of an image will be much more important than its texture characteristics. There may also be cases where only some of the available primitives are required in order to determine which images should be considered the most similar.

Weights

Applications are given flexibility in how the overall score is computed through use of a weights structure. The weights structure includes a weight for each primitive. The application has control over the weight values for any given comparison through the weights structure, and the following functions.

> create_weights—This function is used to allocate a weights structure for use in the compare functions. The associated schema_id will determine the specific format of the structure.
>
> destroy_weights—This function is used to free the memory previously allocated with create_weights( ).
>
> set_weight—This function sets the weight in the weights structure identified by the given primitive_id, which identifies the primitive whose weight is to be set. The value should be a positive floating point number. In general, weights are normalized before use by calling normalize_weights( ).
>
> get_weights—This function is used to extract an individual weight value from a weights structure.

Note that other interesting visual parameters may be surfaced in a user interface by combining the weights of the primitives in intelligent ways. For example, a visual quantity called "Composition" may be synthesized by controlling the relative weighting of the color primitives.

Two examples of utilizing weights with the primitives by use of the weights sliders (e.g., 208) in the query window 200 (FIG. 3) are as follows:

> Texture: The VIR Engine evaluates pattern variations within narrow sample regions to determine a texture value. It evaluates granularity, roughness, repetitiveness, and so on. Pictures with strong textural attributes—a sandstone background for example—tend to be hard to catalog with keywords. A visual search is the best way to locate images of these types. For best results, a user should set Texture high when the query image is a rough or grainy background image and low if the query image has a central subject in sharp focus or can be classified as animation or clip-art.
>
> Structure: The VIR Engine evaluates the boundary characteristics of distinct shapes to determine a structure value. It evaluates information from both organic (photographic) and vector sources (animation and clip art) and can extrapolate shapes partially obscured. Polka dots, for example, have a strong structural element. For best results, a user should set Structure high when the objects in the query image have clearly defined edges and low if the query image contains fuzzy shapes that gradually blend from one to another.

Comparison

To get the result of an image comparison, the application supplies the precomputed primitive vectors from two images, together with a set of weights to a first API called Compare. The system fills in a score data structure and returns a pointer to the caller. A second API called CompareIntoScores caches the primitive component scores for later use. A function RefreshScores can efficiently recompute a new score for a different set of weights (but the same query image, i.e., a re-query). This second API call takes a score structure and a weights structure, and recomputes a final score (ranking) without needing to recompute the individual primitive similarities. A third API call (ThresholdCompare) is an extension of the first, in that the user also supplies a threshold value for the score. Any image having a distance greater than this value is considered non-qualifying, which can result in significant performance gains since it will probably not be necessary to compute similarity for all primitives.

Every application may have unique requirements in the way the application determines which images are to be considered most similar, and how to efficiently manage a changing set of results. Certain applications may need to do an exhaustive comparison of all images in the candidate set, while others are only "interested" in a certain set which are most similar to the query description. Certain applications (or situations) may also require the ability to quickly manipulate the relative importance of the primitives, using the individual primitive scores and weights, as discussed above. In another embodiment of the present engine, comparison functions may be structured as follows:

> compare—This is the simplest entry point for computing the overall visual similarity for two given images, represented by their respective visual features. The caller passes in a weights structure and two feature vectors, and compare( ) computes and returns the weighted overall score, which is a numerical value preferably in the range [0.0 . . . 100.0]. This function can be used when a score is required for every candidate image. If only the top N scores are required, the function threshold_compare( ) may be more appropriate.

heterogeneous_compare—This is a variation of the standard compare described above, wherein the schemas for each of the two images have the same primitives. In the heterogeneous compare, each of the two images may have been analyzed by use of a different schema. For example, a feature vector for image A is based on a different set of primitives than a feature vector for image B.

threshold_compare—This function can be used for optimized searches in which the scores of every single candidate image are not required. A threshold similarity distance is passed in to indicate that any image whose score is above the threshold is not of interest for this search. As soon as the engine determines that the image is outside this range, it terminates the similarity computation and returns a flag to indicate that the threshold has been exceeded. This provides a significant performance boost when top N style searches are sufficient. Top N queries will be described in conjunction with FIG. 14. Again, it is the application's responsibility to determine the appropriate threshold value for each comparison.

Query Optimization

A final aspect of the Extensible Engine is the notion of query optimization. Each primitive provides a similarity function to the Engine. During the "threshold compare" operation, the Engine attempts to visit the primitives in an order such that it can determine as cheaply as possible if the comparison score will exceed the passed-in threshold. As soon as it is exceeded, the rest of the primitive comparisons are aborted. Two main factors play into the query optimization scheme: the weighting associated with that primitive, and the cost of executing the comparison operation for that primitive. Application developers can tell the Engine what the cost of their primitive's similarity function is during the registration process. Developers that construct their own primitives can help the optimizer by providing accurate cost information for their custom Compare function. The following description explains how to determine the cost of the custom Compare function for the new primitive.

The cost value is a positive number which cannot be 0.0. If the application uses all custom primitives, then the actual values of these costs are not important. They should merely be relatively correct. Values of 1.0, 2.0, and 3.0 are the same as 100, 200, 300. However, if the application developer wishes to integrate some custom primitives with the default primitives previously described, then the cost values must be calibrated with respect to the cost values for the default primitives.

In one presently preferred embodiment, the nominal baseline for computation cost may be arbitrarily set by defining that the VIR_GLOBAL_COLOR primitive has a cost of 1.0. On this scale, the default primitives have the following costs:

| | |
|---|---|
| Global Color | 1.00 |
| Local Color | 2.20 |
| Texture | 4.10 |
| Structure | 2.30 |

To calibrate a custom primitive against this cost scale, some empirical experiments must be performed and the execution of the new procedures timed relative to the time taken by the Global Color primitive. This ratio is the cost value that should be passed to the primitive registration procedure. A skeleton benchmark application is provided as an example with the Extensible Engine API that can be used to help develop new primitives and assess their cost. It constructs a schema with only the Global Color primitive as a timing baseline. The application developer then can construct a schema with only the new primitive to establish its cost relative to the Global Color primitive.

If the cost value for a new primitive is unknown, or if its execution time varies widely depending on the image that is being analyzed, then it is best to estimate the cost, or use the value 1.0.

Flowchart and Architecture Descriptions

Figure 6:
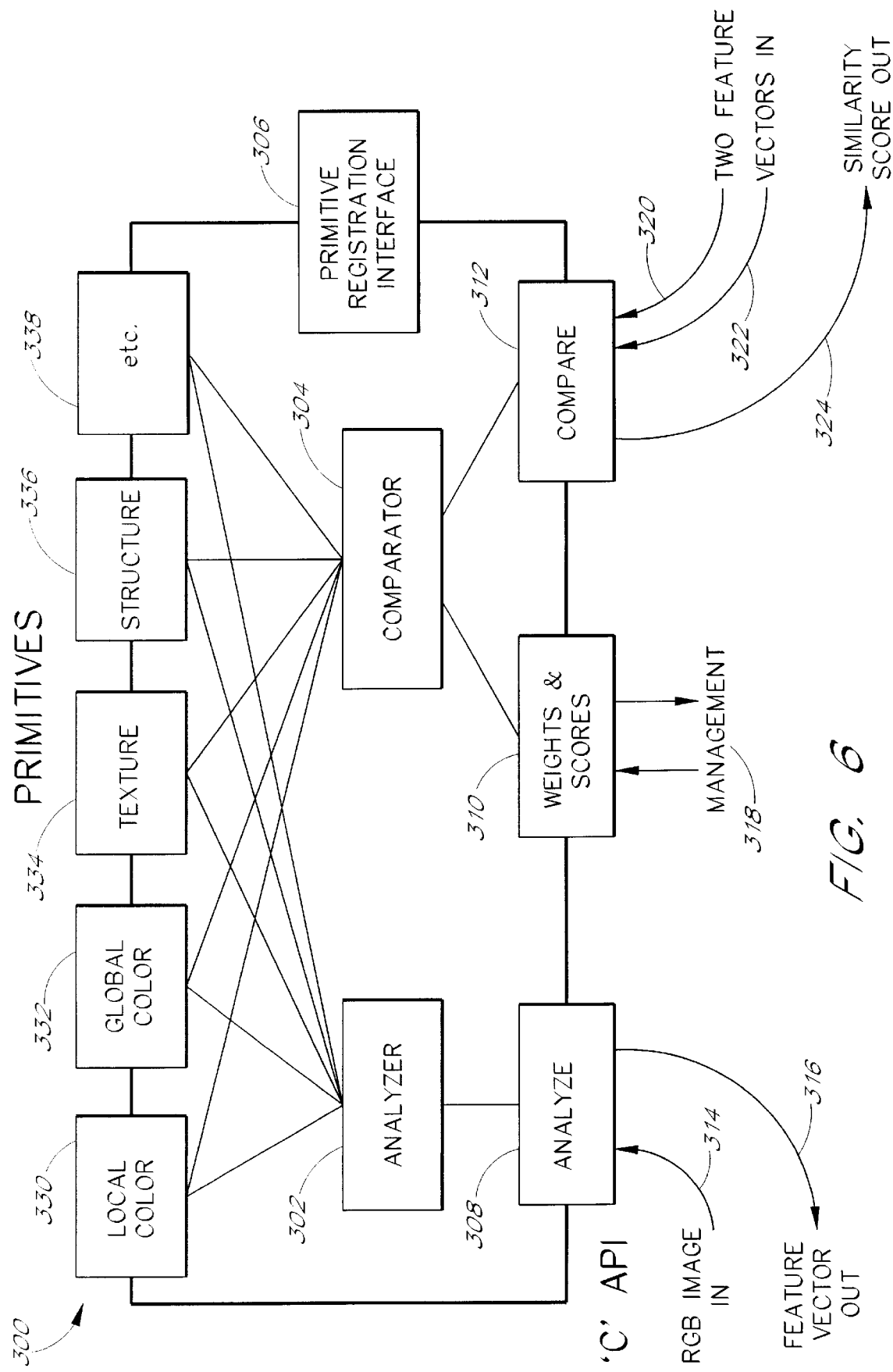
FIG. 6 is a block diagram showing the components of the Extensible VIR Engine.

Referring to FIG. 6 the components of the extensible VIR engine will be described. As previously described above, the components are part of the "C" API. Of course, other computer languages can be used for the API. The extensible VIR engine 300 includes three main components: an analyzer 302, a comparator 304 and a primitive registration interface 306. The analyzer 302 is similar to the analysis module 122 and the comparator 304 is similar to the image comparison module 124, previously shown in FIG. 1A. The analyzer 302 has an analyze interface 308 to communicate with external components. The analyze interface 308 receives a RGB format image as input 314 and generates a feature vector as output 316. The comparator 304 has two interfaces, a weights and scores interface 310 and a compare interface 312. The weights and scores interface 310 communicates with a management function 318 handled by the application. The compare interface 312 receives two feature vectors in, a target feature vector 320 and a feature vector 322 for the current image being tested or compared. Associated with the extensible VIR engine 300 are a set of primitives. A developer can specify a set of primitives that are to be used for a particular image domain. The extensible VIR engine 300 includes four universal or default primitives: local color 330, global color 332, texture 334, and structure 336. The developer may choose to use one or any number of these universal or primitives for his application. In addition, the developer may define one or more custom primitives and register the primitives with the primitive registration interface 306. The process of registering new custom primitives will be further described hereinbelow.

Figure 7:
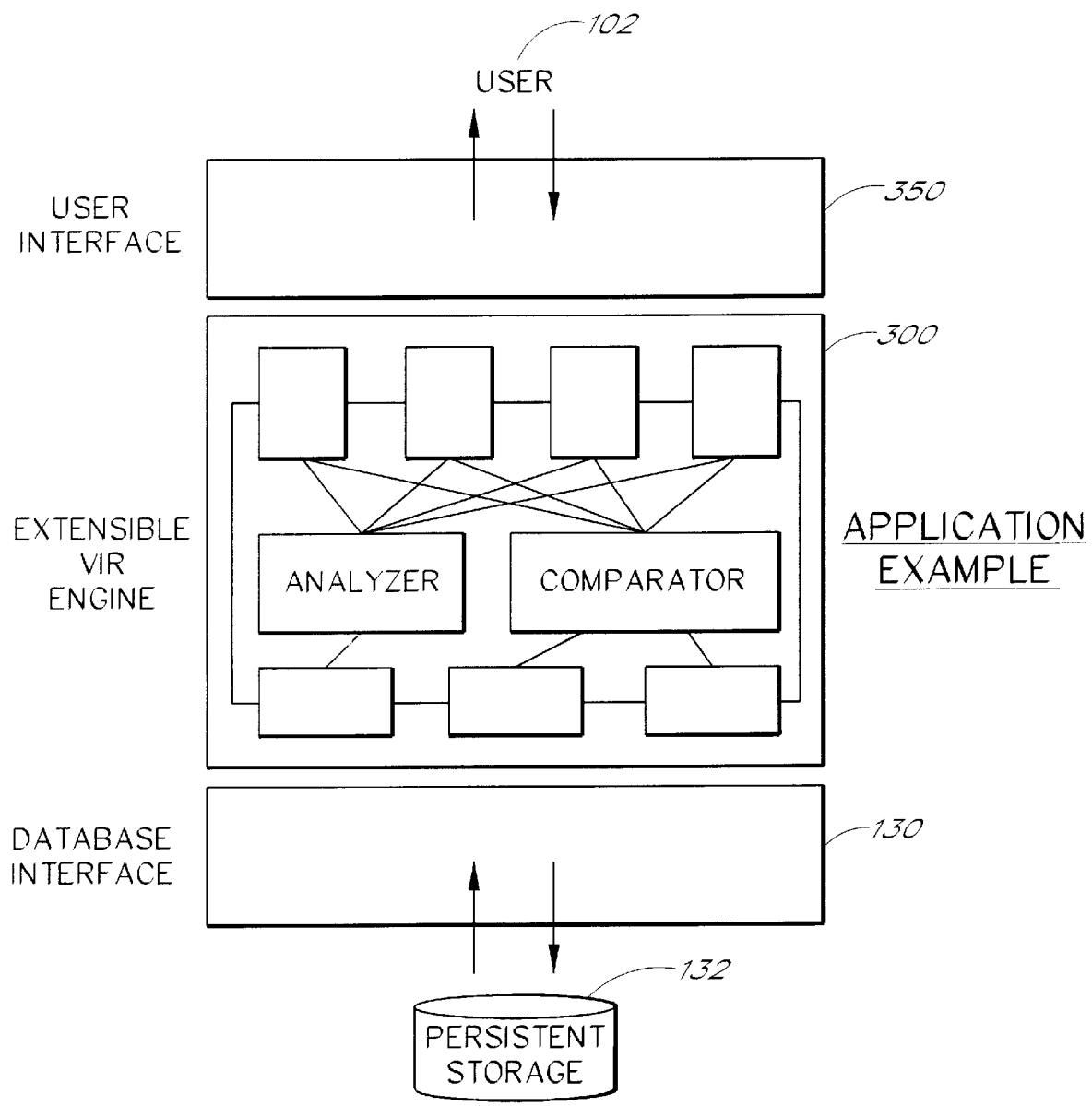
FIG. 7 is a block diagram of an exemplary VIR system utilizing the Extensible VIR Engine of FIG. 6.

Referring now to FIG. 7, an exemplary VIR system utilizing the extensible VIR engine 300 will be described. The extensible VIR engine 300 communicates with the user 102 through a user interface 350. The user interface 350 may include modules such as the Query Canvas module 108 and the Image Browsing module 110, which were previously described in conjunction with FIG. 1A. The extensible VIR engine 300 also is in communication with persistent storage 132 through a database interface 130. The database interface 130 is typically a database engine such as previously described above. An application developer has complete freedom in defining the user interface 350 and the database interface 130 to meet the needs of the particular domain at issue.

Figure 8:
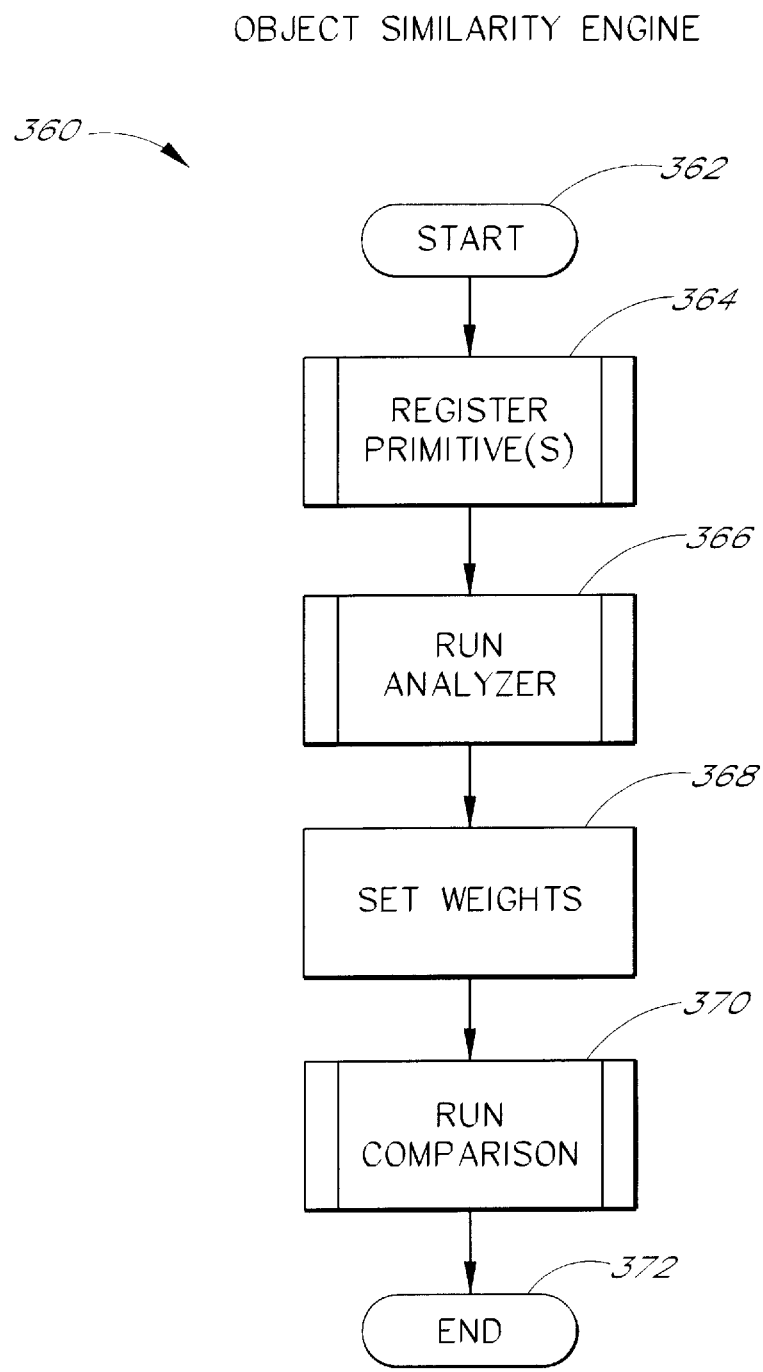
FIG. 8 is a high level flowchart of the operation of the Extensible VIR Engine shown in FIG. 6.

Referring to FIG. 8, an operational flow 360 of the extensible VIR engine 300 will now be described. The engine flow 360 is invoked by an application such as the example shown in FIG. 7. Beginning at a start state 362, the engine moves to process 364 to register one or more primitives through the primitive registration interface 306 (FIG. 6). Process 364 will be further described in conjunction with FIG. 13. In typical operation of the extensible VIR engine 300, the user will provide a query object, such as through use of the Query Canvas 108 (FIG. 5A) or by browsing the file system 110 to identify the query object. Moving to a run analyzer process 366, a query object is analyzed by the analyzer 302 (FIG. 6) to create a feature vector for the query image. Proceeding to state 368, the user typically provides or sets weights through the user interface 350 (FIG. 7). Moving to a run comparison process 370, the comparator 302 (FIG. 6) determines a similarity score for the two feature vectors that are passed to it. The compare operation is typically performed on all the images in the database 132 unless a database partition has been identified or another scheme to compare or test only a portion of the images in database 132 is established. Once all the images have been compared by the run comparison process 370, the engine moves to end state 372 and control returns to the calling application.

Figure 9:
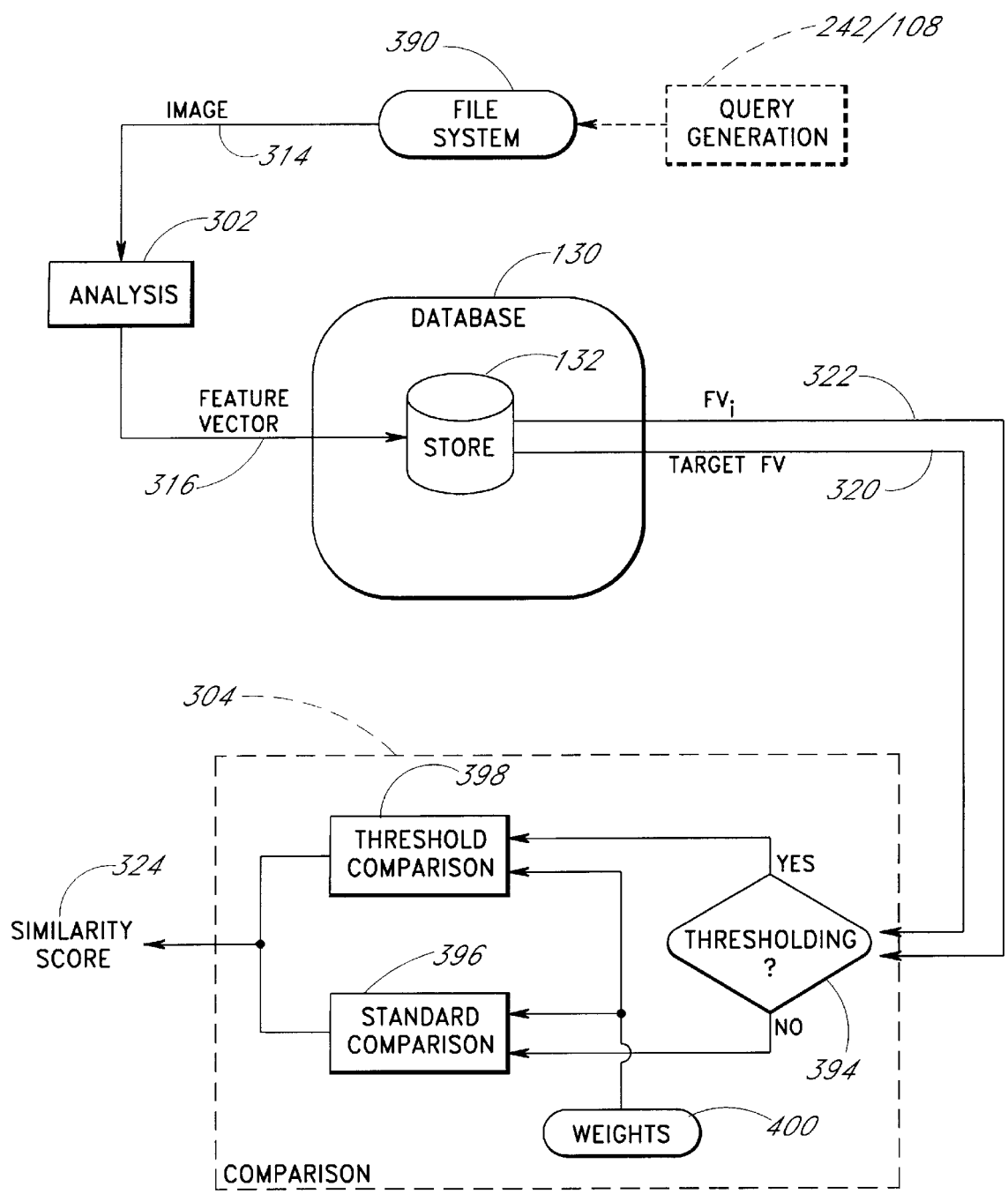
FIG. 9 is a flow diagram of portions of another embodiment of a VIR system utilizing the Extensible VIR Engine of FIG. 6.

Referring to FIG. 9, another embodiment of a VIR system utilizing the extensible VIR engine 300 will now be described. As previously described in conjunction with FIG. 5A, several methods of generating a query have been shown. One of these methods includes the query generation and Query Canvas method 242/108, whereby the user draws or sketches a query image or modifies an existing image. Alternatively, the user may browse the file system 390 to identify an object or image to be used as the query 314. The query object 314 is passed onto the analyzer 302 for analysis to generate a feature vector 316 for the query. The feature vector 316 is sent to the database engine 130. Generally, the feature vector for the query image is only needed temporarily to process the query. The query feature vector is usually cached in random access memory (RAM), associated with the database engine 130, for the query operation. For some database implementations, the query feature vector is placed in a temporary table by the database engine 130.

A feature vector for the query target 320 and a feature vector 322 for one of the images in the database store 132 are retrieved by the database engine 130 and sent to the comparator 304 for comparison. At the comparator 304, a thresholding decision 394 is checked to determine if thresholding is to be applied to the comparison method. If not, a standard comparison 396 will be performed utilizing the weights 400 as set by the user 102 (FIG. 1A). The standard comparison 396 will be further described in conjunction with FIG. 11. If thresholding is desired, the comparison will be performed by the threshold comparison process 398 also utilizing the weights 400. The threshold comparison 398 will be further described in conjunction with FIG. 12. A similarity score 324 is output by either the threshold comparison 398 or the standard comparison 396. The similarity score 324 is utilized by the calling application for use in presenting the resultant images. Presentation may be putting thumbnails in a ranked order, for example.

Figure 10:
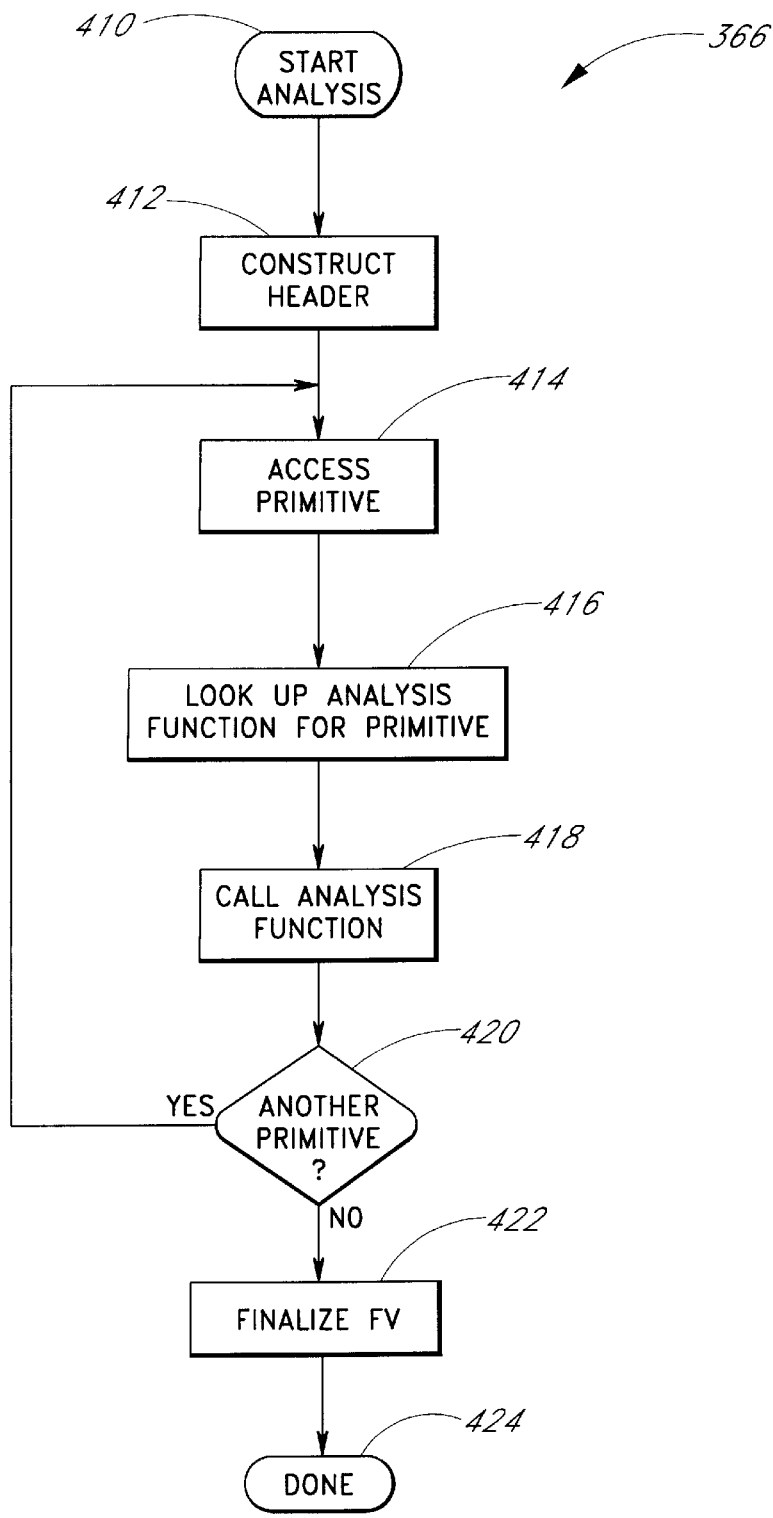
FIG. 10 is a flowchart of the run analyzer function 366 shown in FIG. 8.

Referring to FIG. 10, the analysis performed by the run analyzer process 366 (FIG. 8) will now be described. Recall that a schema is a collection of primitives defined by a developer or application programmer. These primitives may include some or all of the universal primitives built into the VIR engine and any custom primitives defined by the developer for a schema. Also recall that each custom primitive must have an analysis function and a comparison function, and the primitive is registered through the primitive registration interface 306 (FIG. 6). These functions along with the analysis and comparison functions for the universal primitives are all stored in a lookup table for the schema.

The process 366 takes as input an image and provides as output a feature vector. Beginning at a start analysis state 410, the analysis process 366 moves to a state 412 to construct a header for the feature vector. A schema ID for the object or image that is to be analyzed is an input to the construct header state 412. The schema ID is obtained from the schema creation process described in conjunction with FIG. 13. The user identifies the schema to be used for analysis of the visual objects through the application program. Using the schema ID, the corresponding schema or lookup table structure is accessed which lists the respective primitives and functions. There is one individual lookup table per schema. Accessing the first primitive in the lookup table for the schema at state 414, the analysis process 366 proceeds to state 416 and looks up the analysis function for that primitive in the schema lookup table. Proceeding to state 418, the analysis function for the current primitive is called and the analysis function is performed. The input to the analysis function at state 418 is the image to be analyzed including its height and width characteristics. The output of state 418 is the feature data for the current primitive which is placed in the feature vector under construction. Any of various statistical techniques are used in the analysis function for the current primitive. For example, histogramming could be used, such as a color histogram. As another example, a mean intensity primitive could be defined as the sum of the intensity of all the pixels in an image divided by the number of pixels in the image.

These techniques are well-known by those skilled in the relevant technology. Proceeding to decision state 420, the analysis process 366 determines if there are additional primitives in the current schema that need to be processed. If so, the analysis process 366 moves back to state 414 to access the next primitive in the current schema. If all the primitives in the current schema have been processed, the analysis process proceeds to state 422 to finalize the feature vector for the current image. At state 422, the analysis process 366 computes the total resulting size of the feature data and updates the size in the header for the feature vector. In another embodiment, checksums are also computed at state 422. The complete feature vector contains the header information and the feature data for each of the primitives in the schema. The analysis process 366 completes at a done state 424.

Figure 11:
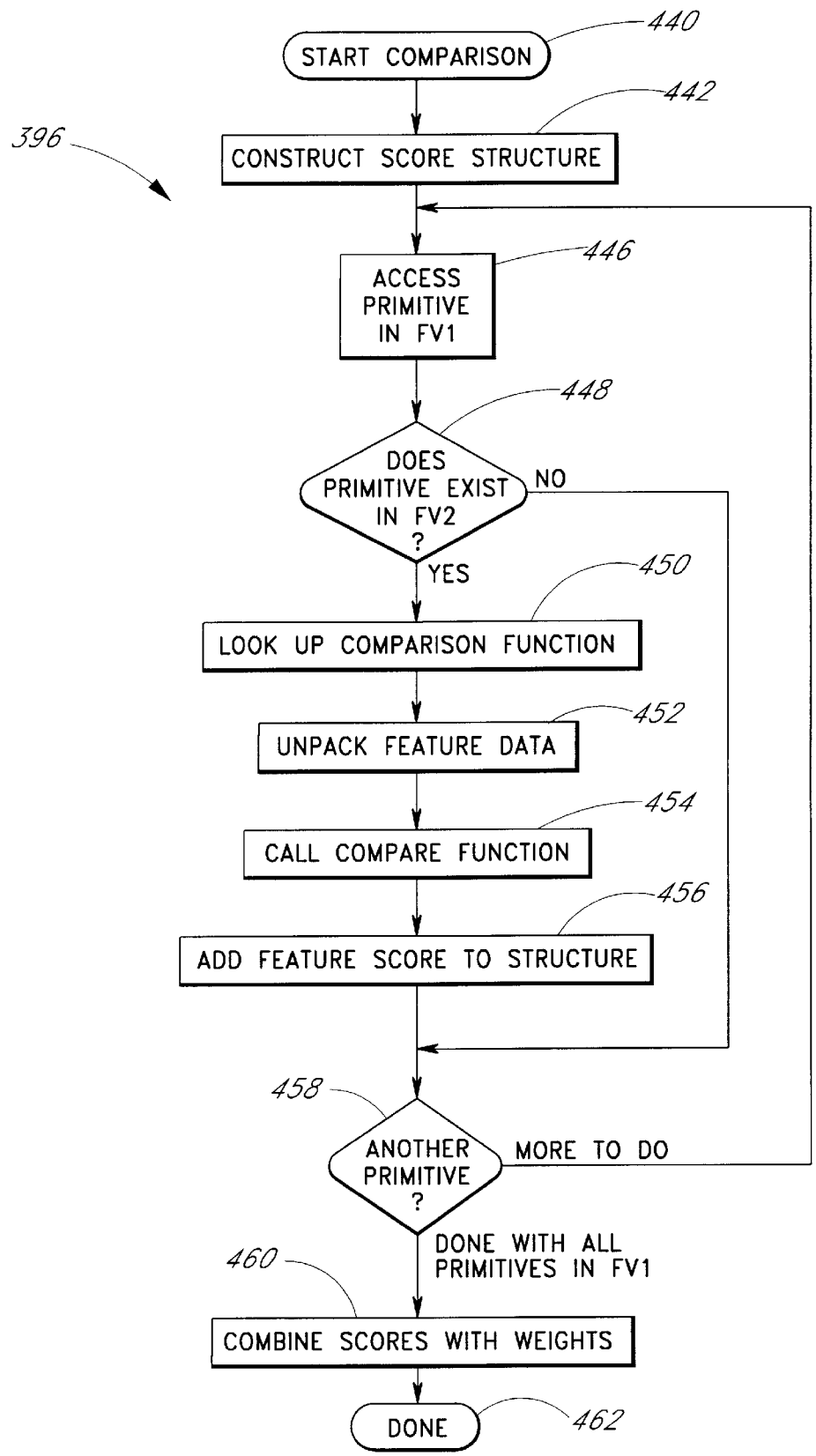
FIG. 11 is a flowchart of the standard comparison function 396 shown in FIG. 9.

Referring now to FIG. 11, the standard comparison process 396 shown in FIG. 9 will be described. In a manner similar to the analysis process 366 previously described, a comparison function for each custom primitive must be registered through the primitive registration interface 306 (FIG. 6). The registered comparison functions are stored in the schema lookup table. The input utilized by the standard comparison process 396 includes two feature vectors to be compared and weights for each primitive. If the primitives for each of the two feature vectors are the same, the standard comparison is considered to be a homogeneous comparison. However, if each of the two feature vectors is associated with a different schema, but has at least one primitive in common between the two feature vectors, the comparison is considered to be a heterogeneous comparison. As will be seen below, the standard comparison process 396 accomplishes either type of comparison.

Beginning at a start comparison state 440, the comparison process 396 moves to a state 442 to construct a score structure for the comparison. The score structure is initialized to be an empty score structure at this point. The score structure contains space for one score per primitive plus an overall score. Proceeding to state 446, the comparison process 396 accesses a primitive in feature vector 1 (FV1), which is associated with the first of the two images being compared by the comparison process. For instance, FV1 may be the result of analyzing the target image. Moving to a decision state 448, the comparison process 396 determines if the primitive accessed in state 446 exists in feature vector 2 (FV2), which is associated with the second of the two images being compared. FV2, may, for instance, correspond to a candidate image. If the same primitive does exist in feature vector 2, the comparison process 396 proceeds to state 450 to look up the comparison function, for the current primitive in the schema lookup table for FV1. Continuing at state 452, the feature data associated with the current primitive from both feature vector I and feature vector 2 is unpacked. Recall that each feature vector is a concatenation of feature data elements corresponding to the set of primitives in the schema. Advancing to state 454, the compare function accessed at state 450 is invoked and receives the feature data unpacked at state 452. The result of calling and executing the compare function at state 454 is a primitive score. An exemplary primitive having only one dimension or property is mean intensity. In this example, the distance or primitive score between feature vector 1 and feature vector 2 could be (X1-X2). For primitives having multiple dimensions, such as texture which may have as many as 35 dimensions, the presently preferred embodiment uses a Euclidean metric. An equation for an exemplary Euclidean metric is as follows:

$$s_i = \left( \sum_j (FV1(j) - FV2(j))^2 \right)^{1/2}$$

Other techniques to determine the primitive score, such as histogram intersection or other histogram techniques, may be used in other embodiments.

Moving to state 456, the primitive score or feature score is placed into the score structure constructed at state 442 above. Continuing at a decision state 458, the comparison process 396 determines if there are additional primitives in feature vector 1 that need to be processed. If so, the comparison process 396 moves back to state 446 to access the next primitive in feature vector 1. A loop of states 446 through 458 is performed until all primitives in feature vector 1 have been processed. When decision state 458 determines that all primitives have been processed in feature vector 1, comparison process 396 proceeds to state 460 wherein the scores stored in the score structure are combined with the weights 400 (FIG. 9) for each of the primitives passed into the comparison process to generate a final combined score. The final combined score may be generated by a linear combination or a weighted sum:

$$s_f = \sum_i w_i s_i$$

The comparison process 396 completes at a done state 462

Returning to decision state 448, if the current primitive that is accessed in feature vector 1 at state 446 does not exist in feature vector 2, comparison process 396 moves down to decision state 458 to determine if additional primitives exist in feature vector 1, thereby bypassing calling the compare function for the current primitive of feature vector 1. This allows feature vectors from different schemas to be compared but the comparison is only on primitives that are in common between the feature vectors. If all the primitives between the two feature vectors are in common, the comparison will be done for each of the primitives and is a homogeneous comparison.

Figure 12:
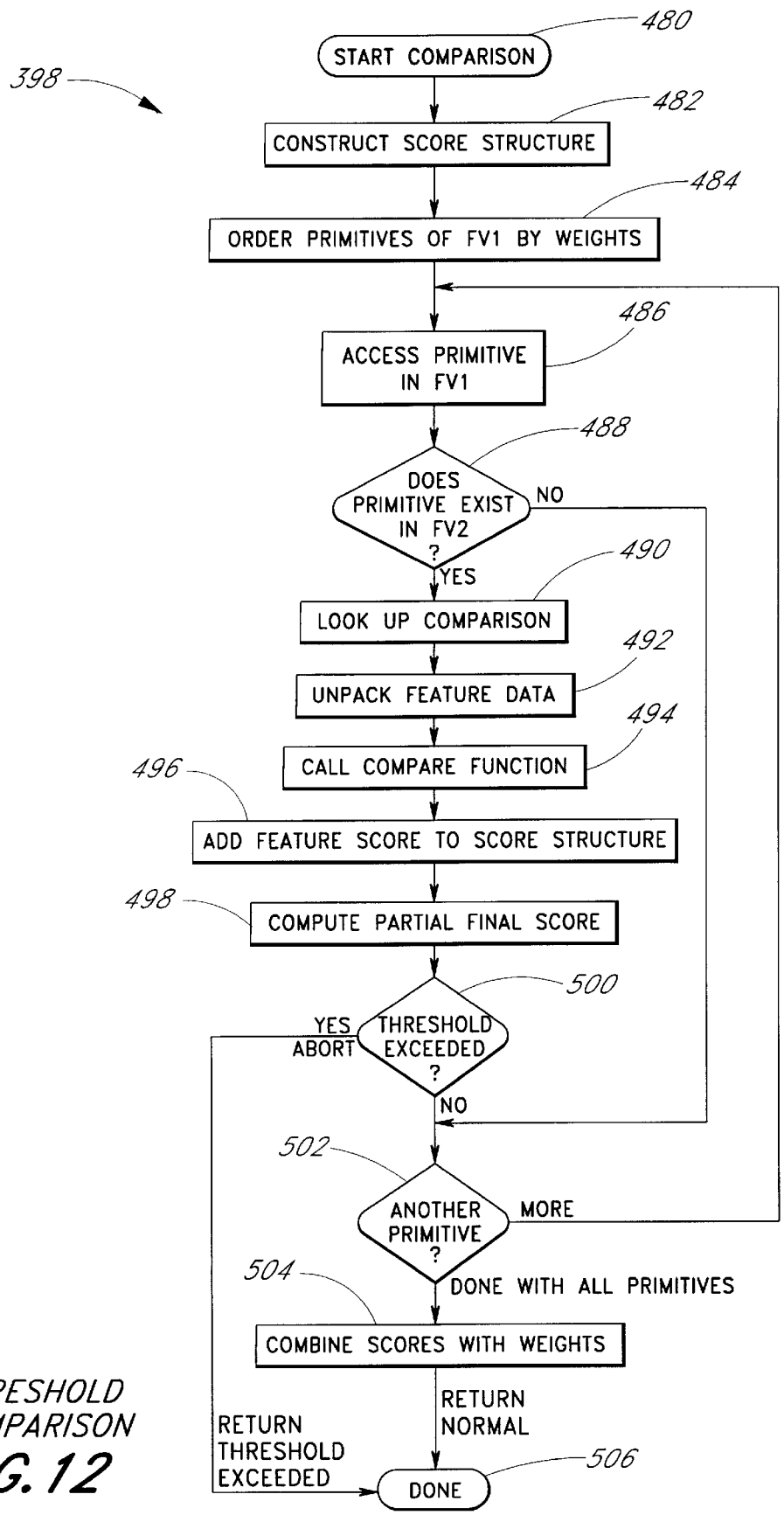
FIG. 12 is a flowchart of the threshold comparison function 398 shown in FIG. 9.

Referring to FIG. 12, the threshold comparison process 398 previously shown in FIG. 9 will now be described. The threshold based comparison 398 allows significant performance benefits to be gained by exploiting the primitive architecture of the VIR engine to intelligently process the comparison. Comparisons proceed by computing the primitive comparison scores for the most heavily weighted primitives first, and trying to prove as soon as possible that the threshold has been exceeded. If the threshold is exceeded, the rest of the primitive comparisons are then aborted. Similar to the standard comparison process 396, previously described, two feature vectors and corresponding weights are input to the threshold comparison process. An additional input is a threshold value, preferably in the range of 0 to 100. The threshold comparison process 398 also performs both homogeneous compares and heterogeneous compares (as done by the Standard Compare). The threshold comparison process 398 can be performed on both the Base VIR Engine and the Extensible VIR Engine. However, the Base VIR Engine may also perform a heterogeneous compare. In one preferred embodiment, a heterogeneous compare can be performed only if at least one of the schemas utilizes a subset of the default primitives.

Beginning at a start comparison state 480, the threshold comparison process 398 proceeds to state 482 to construct a score structure for the comparison. The score structure is initialized to be empty. Continuing at a state 484, the primitives of feature vector 1 (FV1), in the presently preferred embodiment, are ordered by weights, with the highest weighted primitive ordered first and the lowest weighted primitive ordered last. A cost is optionally associated with each primitive to further order the primitives. The costs were previously described in the query optimization description. The cost value and the weight can be combined by a developer-defined function to order the primitives. For example, the function could be multiplication. As another example, if the costs are normalized to [0 . . . 1] beforehand, a Maximum function can be used as follows: Max((1.0-cost), weight). In another embodiment, only the costs are used to order the primitives.

Proceeding to state 486, the highest weighted primitive in feature vector 1 is accessed. Subsequent states 488 through 496 are similar to states 448 through 456 of the standard comparison process 396 shown in FIG. 11, and thus will not be described in detail here. If the primitives of the two feature vectors are in common, the comparison function for the primitive is called (state 494) and the primitive score is computed and stored in the score structure at state 496. Moving to state 498, a partial final score is computed using the weights and the scores stored in the score structure so far. Moving to a decision state 500, the threshold comparison process 398 determines if the partial final score, also known as a weighted primitive score, exceeds the threshold passed into the comparison process 398. If the threshold has not been exceeded, as determined at decision state 500, the comparison process 398 continues at a decision state 502 to determine if there are additional primitives to be processed. If there are additional primitives to be processed, threshold comparison process 398 moves back to state 486 to access the next highest ordered primitive in feature vector 1. A loop of states 486 through 502 continues until all primitives in feature vector 1 are processed unless the threshold has been exceeded as determined at decision state 500. If the threshold has been exceeded at decision state 500, the threshold comparison process 398 aborts the loop, moves to done state 506 and returns with an indication that the threshold has been exceeded.

Returning to decision state 502, if all primitives in feature vector 1 have been processed, threshold comparison process 398 moves to state 504 to determine a final combined score.

State 504 is optional if the score from state 498 has been saved. If the score has not been saved, the final score is computed using the scores stored in the score structure and the weights. The threshold comparison process 398 returns with a normal indication at the completion of state 504 and completes at the done state 506.

Figure 13:
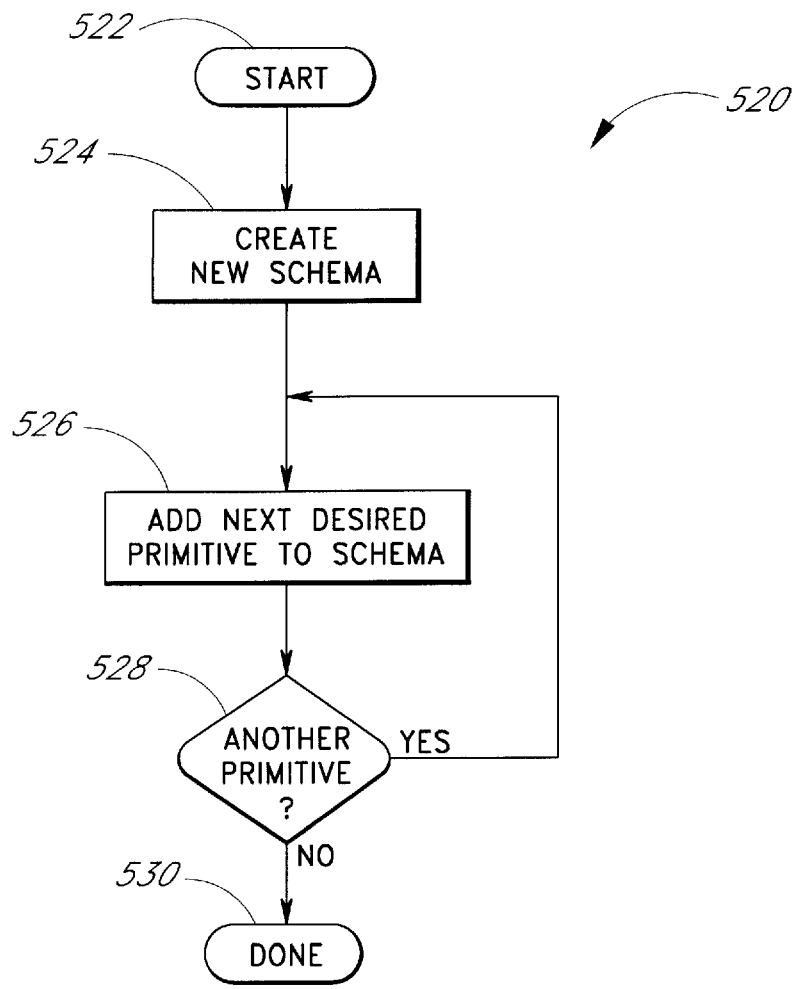
FIG. 13 is a flowchart of a schema creation and primitive registration function which is performed, in part, by the primitive registration interface 306 shown in FIG. 6.

Referring to FIG. 13, a schema creation and primitive registration process 520 will be described. This logic is executed by the application. A developer may typically create a new schema for a certain domain of objects or images. Examples of domains where new schemas may be created include face recognition, mammography, ophthalmological images and so forth. As previously described, each custom primitive requires a primitive ID, a label, an analysis function, a compare function, a swap (endian) function and a print function. This process 520 is a portion of the primitive registration interface 306 (FIG. 6).

Beginning at a start state 522, the schema creation process 520 proceeds to state 524 to create a new schema. Creating a new schema is a function of the extensible VIR engine 300. The output of state 524 is a schema ID which allows the registered primitives to be identified. The results of state 524 also include an empty schema structure, which includes the schema ID. Moving to state 526, a primitive desired for this schema is added to the schema structure. Adding the primitive to the schema is a function of the extensible VIR engine 300. Moving to a decision state 528, the schema creation process 520 determines if another primitive is to be added to the current schema. If so, process 520 moves back to state 526 to add the next desired primitive to the schema. When all desired primitives have been added to the schema as determined at decision state 528, schema creation process 520 completes at a done state 530. At this point, a final schema table identified by the schema ID and including all the desired primitives has been created. The desired primitives may include any custom primitives or any of the default or standard primitives, such as global color, provided in a library.

Figure 14:
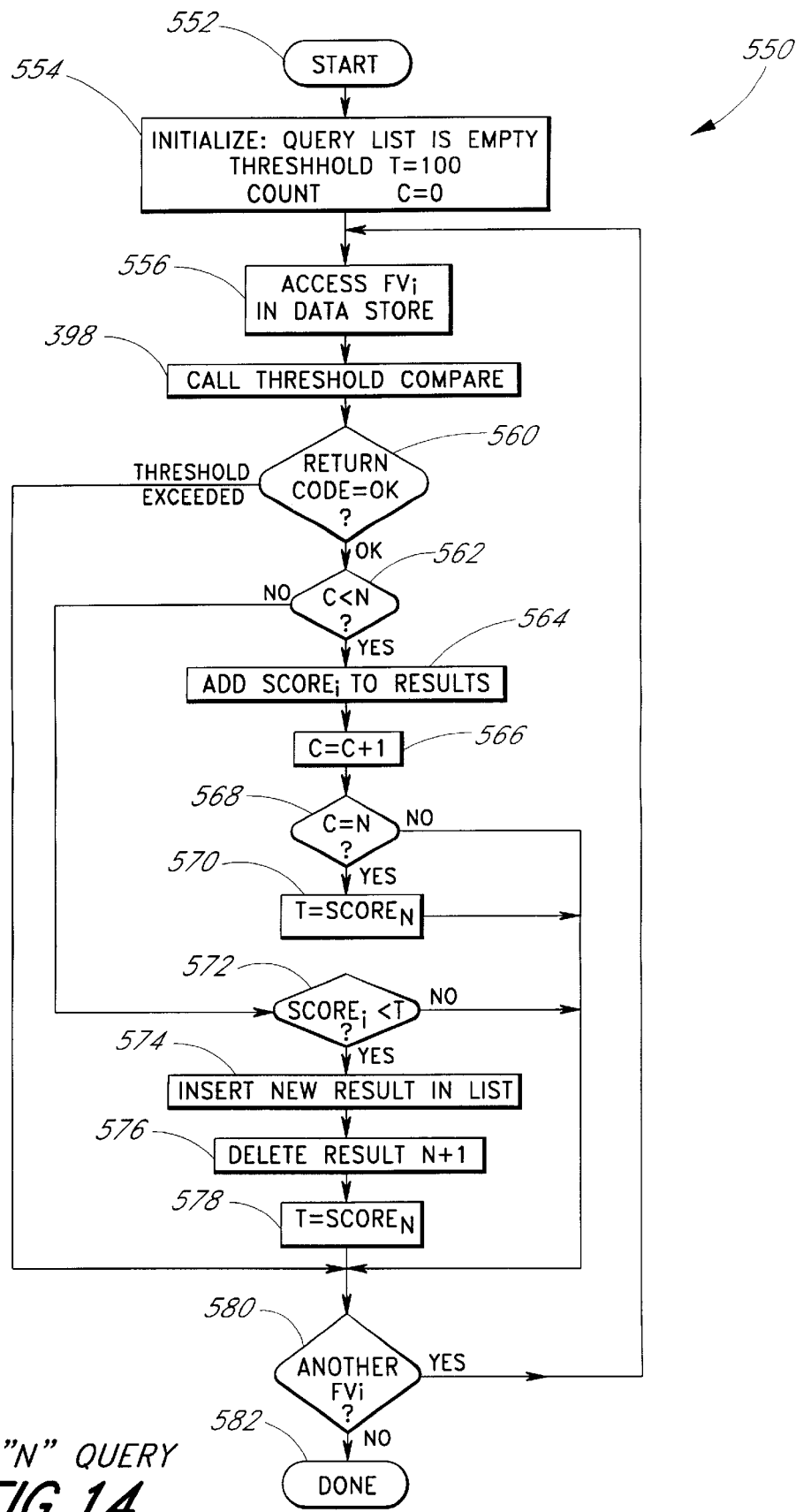
FIG. 14 is a flowchart of a top "N" query function performed by either the Base VIR Engine of FIG. 1A or the Extensible VIR Engine shown in FIG. 6.

Referring to FIG. 14, the top "N" query process 550 will now be described. The top N query is an exemplary usage of the threshold comparison 398 by an application to provide a performance gain. The top N query process 550 is used in a search where a fixed number of results "N" is desired and N is known beforehand, e.g., N is provided by the application program. When N is small compared to the size of the database to be searched, the use of the threshold comparison 398 can result in a significant increase in speed of processing. The inputs to this process 550 are the query target object to be searched against represented by its feature vector $FV_{TARGET}$, the weights for the primitives in this feature vector, and the desired number of results "N".

Beginning at a start state 552, query process 550 moves to state 554 wherein initialization is performed: a query results list is cleared to an empty state, a threshold variable "T" is set to be 100 (the maximum value of the preferred range [0 . . . 100]), and a result count variable "C" (the number of results so far) is set to zero. The count C will be in the range $0 \leq C \leq N$. Proceeding to state 556, query process 550 accesses the feature vector $FV_i$ for the first object in the database store 132 (FIG. 9). The query process 550 then calls the threshold compare process 398 (FIG. 12) which is a function of both the extensible VIR Engine 300 and Base VIR engine 120. The feature vectors for the target object ($FV_{TARGET}$) and the current object ($FV_i$) (from state 556) along with the primitive weights and the threshold T are all passed in to the threshold process 398. Moving to a decision state 560, the query process 550 determines if the return code from the threshold compare process 398 is "normal" (ok). If so, query process 550 proceeds to a decision state 562 to determine if the number of results so far is less than the desired number of results (C<N). If so, query process 550 moves to state 564 to add the score $S_i$ returned from the threshold compare process 398 to the query results list in an order that is sorted by score. The number of entries in the sorted results list thereby increases by one and has $\leq N$ entries. Moving to state 566, query process 550 increments the result count C by one. Proceeding to a decision state 568, the query process 550 determines if the number of results so far is equal to the desired number of results (C=N). If so, the query process 550 advances to state 570 wherein threshold T is set equal to the score ($score_N$) of the $N^{th}$ (last) result in the sorted results list. The query process 550 continues at a decision state 580 to determine if there are additional objects having feature vectors ($FV_i$) in the database 132. If so, query process 550 moves back to state 556 to access the next feature vector in the database store 132. A loop of states 556–580 is executed until all the feature vectors in the database store 132 have been processed, at which time the query process 550 is finished at a done state 582.

Returning to the decision state 568, if the value of C does not equal the value of N, the query process 550 proceeds to the decision state 580 to determine if there are additional feature vectors to process, as previously described. The threshold T is not changed in this situation.

Returning to the decision state 562, if the value C is not less than the value of N (i.e., C=N), the query process 550 continues at a decision state 572. At decision state 572, a determination is made as to whether the score $S_i$ returned from the threshold compare process 398 is less than threshold T (which is either the initialization value of 100 or the score of result N of the sorted results list set by either state 570 or state 578 in a prior pass of the process 550). If not, (i.e., $S_i$ is equal to or greater than T) query process 550 proceeds to the decision state 580 to determine if there are additional feature vectors to process, as previously described. However, if the score $S_i$ is less than T, as determined at decision state 572, the query process 550 proceeds to state 574 wherein the new result score $S_i$ is inserted into the results list sorted by score. At this time, the results list temporarily has N+1 entries. Advancing to state 576, the query process 550 deletes the last result (N+1) in the sorted results list. Moving to state 578, the query process 550 sets threshold T equal to the score ($score_N$) of the new $N^{th}$ (last) result in the sorted results list. The query process 550 continues at the decision state 580 to determine if there are additional objects having feature vectors ($FV_i$) in the database 132, as previously described.

Returning to the decision state 560, if the return code from the threshold compare process 398 is "threshold exceeded", the score for the current feature vector is ignored and the query process 550 proceeds to the decision state 580 to determine if there are additional feature vectors to process, as previously described.

The output of the query process 550 is the sorted results of the top N feature vectors. This output is sorted by score.

IV. APPLICATIONS

The VIR Engine directly implements the Visual Information Model previously described and acts as the hub around which all specific applications are constructed. The Engine serves as a central visual information retrieval service that fits into a wide range of products and applications. The Engine has been designed to allow easy development of both horizontal and vertical applications.

Vertical Applications

Because the facility of content-based image retrieval is generic, there is a large potential for developing the VIR technology in several vertical application areas, such as:

- digital studio
- document management for offices
- digital libraries
- electronic publishing
- face matching for law enforcement agencies
- medical and pharmaceutical information systems
- environmental image analysis
- on-line shopping
- design trademark searching
- internet publishing and searching
- remotely sensed image management for defense
- image and video asset management systems
- visual test and inspection systems To explain why the VIR technology is a central element in these applications, let us consider some application possibilities in detail.

Environmental Imaging

Environmental scientists deal with a very large number of images. Agencies such as NASA produce numerous satellite images containing environmental information. As a specific example, the San Diego Bay Environmental Data Repository is geared towards an . . .

" . . . understanding of the complex physical, biological and chemical processes at work in the Bay . . . it is possible to correlate these different kinds of data in both space and time and to present the data in a visual form resulting in a more complete picture of what is and what is not known about the Bay . . . This is the kind of information that is required to assist decision makers in allocating scarce resources in more effective and informative monitoring programs by sharing data, eliminating redundant monitoring and reallocating resources to more useful and effective purposes. Another key component of this work is to provide all of these data and resultant analyses to the public-at-large . . . through the World-Wide-Web of the Internet."

(From the San Diego Bay Project home page)

For such applications, the methods are applicable to any geographic area in the world. Many of the datasets for environmental information are in the form of directly captured or computer-rendered images, which depict natural (mostly geological) processes, their spatial distribution, and time progression of measurands. It is a common practice for environmental scientists to search for similar conditions around the globe, which amounts to searching for similar images.

Medical

A significant amount of effort is being spent in nation-wide health care programs for early detection of cancer. Image comparison is one of the fundamental methods for detecting suspicious regions in a medical image. Specifically, consider a cancer-screening center where a large number of fine needle aspiration cytology (FNAC) tests are conducted daily for breast cancer. We can envision a system that uses the system's image-similarity techniques to provide an intelligent screening aid for the practicing cytologist. After the slide is prepared, it is scanned by a camera-equipped microscope at different levels of magnification. At each magnification level, the slide is compared to a database of other slides (or an existing pre-annotated atlas) at the same magnification, and similarity is computed in terms of cell density, number of nuclei, shapes of nuclei, and number of dividing cells. Suspicious regions of the slide are presented to the cytologist for closer inspection. If nothing suspicious is found, the system might suggest skipping the next higher level of magnification. The cytologist could always override the suggestion, but in general, it would save the cytologist the tedium of scanning through the entire slide, and thus increase his or her productivity.

Multimedia

Digital libraries of videos are becoming common due to the large number of sports, news, and entertainment videos produced daily. Searching capabilities for a video library should allow queries such as "show other videos having sequences like this one." If the query sequence has a car chase in it, the system should retrieve all videos with similar scenes and make them available to the user for replay. The basic technology to achieve this relies on detection of edit points (cuts, fade-ins, and dissolve), camera movements (pan and zoom), and characterizing a segmented subsequence in terms of its motion properties. Also needed is a smooth integration with a database system containing textual information (such as the cast, director, and shooting locations), and other library facilities for which software products already exist.

V. APPLICATION DEVELOPMENT

A present embodiment of the VIR Engine is delivered as a statically or dynamically linkable library for a wide variety of platforms (such as Sun, SGI, Windows, and Apple Macintosh). The library is database independent and contains purely algorithmic code with no dependencies on file systems, I/O mechanisms, or operating systems. The engine does not impose a constraint on the mechanism used to persistently store the image features. An application could manage the data using a relational database, an object-oriented database, or a simple file system approach. In this way, the VIR Engine is highly portable, and can be considered for specialized processors and embedded applications. FIG. 7 shows the interaction between the Engine and other components of an end-user application.

The VIR Engine is intended as an infrastructure around which applications may be developed. Image management, thumbnails, database interfaces, and user interfaces are the responsibility of the application developer. In particular, persistent storage of feature vectors is up to the application.

The VIR architecture has been designed to support both static images and video in a unified paradigm. The infrastructure provided by the VIR Engine can be utilized to address high-level problems as well, such as automatic, unsupervised keyword assignment, or image classification.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

A sample application template (example program) is provided as follows:

```
/****************************************************************
****************
 *
 *                      example program
 *
 * Description: Example program
 *
 * This simple program exercises typical entry points in the Virage Image
Engine API.
 * In particular, we illustrate:
 *
 * - Creating an Image Engine
 * - Creating a default schema
 * - Creating a media object from an array of pixels
 * - Analyzing a media object to create a feature vector
 * - Creating and setting a weights structure
 * - Comparing two feature vectors to produce a distance
 * - Proper destruction of the above objects
 *
 * Copyright © 1996 Virage, Inc.
 *
 ****************************************************************
****************/
#include <stdlib.h>
#include <stdio.h>
#ifndef VIR_ENG_ENGINE_C_H
#include <eng_engine_c.h>
#endif
#ifndef VIR_VIRCORE_H
#include <vircore_c.h>
#endif
#ifndef VIR_IMG_IO_C_H
#include <img_io_c.h>
#endif
#ifndef VIR_IMG_PRIM_C_H
#include <img_prim_c.h>
#endif
#define WIDTH 128
#define HEIGHT 128
#define IMAGE1 "image1"
#define IMAGE2 "image2"
#define GLOBAL_WEIGHT      1.0
#define LOCAL_WEIGHT       0.5
#define TEXTURE_WEIGHT     0.3
#define STRUCTURE_WEIGHT   0.6
vir_engPrimitiveID
default_primitives[]={ VIR_GLOBAL_COLOR_ID,
                       VIR_LOCAL_COLOR_ID,
                       VIR_TEXTURE_ID,
                       VIR_STRUCTURE_ID };
vir_float
default_weights[]={ GLOBAL_WEIGHT,
                    LOCAL_WEIGHT,
                    TEXTURE_WEIGHT,
                    STRUCTURE_WEIGHT };
#define N_DEFAULT_WEIGHTS 4
/*
 * This convenience function creates a vir_medMedia object from
 * a file which contains raw WIDTH x HEIGHT RGB (interleaved) data,
 * and then computes a feature vector for the object. The feature
 * vector (and its size) are returned to the caller.
 *
 * For users of the Virage IRW module, there are numerous routines
 * for reading and writing standard file formats (ie. gif, jpeg,
 * etc.) directly to/from Virage vir_medMedia objects.
 */
void
CreateAndAnalyzeMedia( const char *           filename,
                       vir._engEngineH        engine,
                       vir_engSchemaH         schema,
                       vir_engFeatureVectorData  ** feature,
                       vir_engByteCount       *  count )
{
    vir_MediaH   media;
    vir_byte *   data;
    vir_unit32   image_size;
    int          bytes_read;
    FILE *       fp;
    /********************>>>>>   Begin Execution
<<<<<*******************/
```

```
        /* Open the file of raw pixels */
        fp = fopen(filename,"rb");
        if (fp == NULL)
        {
           fprintf(stderr,"Unable to open file %s\n",filename);
           exit(-1);
        }
        image_size = WIDTH * HEIGHT * 3;
        /* Create a buffer to hold the pixel values */
        data = (vir_byte *)malloc(image_size);
        if (data == NULL)
        {
           fprintf(stderr,"Problems allocating data buffer\n");
           exit(-1);
        }
        /* Read the pixels into the buffer and close the file */
        bytes_read = fread(data,sizeof(vir_byte),image_size,fp);
        fclose(fp);
        if (bytes_read != image_size)
        {
           fprintf (stderr,"Problems reading file %s\n", filename);
           exit (-1);
        }
        /* Create our media object from the buffer */
        if ( vir_imgCreateImageFromData( WIDTH, HEIGHT, data, &media ) != VIR_OK )
        {
           fprintf (stderr,"Problems creating image\n");
           exit(-1);
        }
        /* Free the data buffer. The media object has made a private copy */
        free(data);
        /* Now we analyze the media object and create a feature vector */
        if ( vir_engAnalyze(engine, schema, media, feature, count) != VIR_OK )
        {
           fprintf (stderr,"Problems analyzing image1\n");
           exit(-1);
        }
        /* Now that we are done with the media object, we destroy it */
        if (vir_DestroyMedia(media) != VIR_OK )
        {
           fprintf (stderr,"Problems destroying media\n");
           exit(-1);
        }
}
int
main(int      argc,
     char * argv[] )
{
     vir_engFeatureVectorData *      feature1;
     vir_engFeatureVectorData *      feature2;
     vir_engByteCount                count1;
     vir_engByteCount                count2;
     vir_engEngineH                  engine;
     vir_engSchemaH                  schema;
     vir_float                       distance;
     vir_engWeightsH                 weights;
     /*********************>>>>>    Begin Execution    <<<<<*********************/
     /* We create a default image engine */
     if ( vir_imgCreateImageEngine( &engine ) != VIR_OK )
     {
         fprintf (stderr, "Problems creating image engine\n");
         exit(-1);
     }
     /* WeCreate a default image schema */
     if ( vir_imgCreateDefaultSchema( vir_DEFAULT_SCHEMA_20, engine, &schema )
!= VIR_OK )
     {
         fprintf (stderr, "Problems creating schema\n");
         exit(-1);
     }
     /* Now we'll use our convenient function to create feature vectors
      * We don't bother checking return codes -- the function bombs out
      * on any error condition . . .
      */
     CreateAndAnalyzeMedia(IMAGE1, engine, schema, &feature1, &count1);
     CreateAndAnalyzeMedia(IMAGE2, engine, schema, &feature2, &count2);
     /*
      * Now I have the feature vectors in hand - - in a real application I might
      * choose to store them persistently -- perhaps as a column in a relational
      * database, as part of an object in an OODB, or as part of the header of a
```

```
     * file format. In this toy example, we'll just compare these vectors
against
     * each other and print out the visual distance between the images that they
     * represent . . . not very interesting, but illustrative at any rate.
     */
    /* Create a weights structure. We initialize the weights to some arbirtrary
     * values which we have #define'd above. In a real application, we would
probably
     * get these weights from a user interface mechanism like a slider, but
again,
     * this is just to illustrate the API . . .
     */
    if ( vir_engCreateAndInitializeWeights( default_primitives,
                          default_weights,
                          N_DEFAULT_WEIGHTS,
                          &weights ) )
    {
        fprintf (stderr,"Problems setting / normalizing weights\n");
        exit (-1);
    }
printf( "Starting 500000 . . . . . . . \n");
for ( int ii = 0; ii < 500000; ii++ )
{
    vir_engCompare( engine, feature1, feature2, weights, &distance );
}
printf( "Done.\n");
    /* Finally, we'll compare the two feature vectors and print out the
distance! */
    if ( vir_engCompare( engine, feature1, feature2, weights, &distance ) !=
VIR_OK)
    {
        fprintf(stderr,"Problems comparing the images\n");
        exit(-1);
    }
    fprintf (stdout,"The distance is %f!\n",distance);
    /* We're done with the feature vectors */
    if (  (vir_engDestroyFeatureVectorData(feature1) != VIR_OK ) ||
          (vir_engDestroyFeatureVectorData(feature2) != VIR_OK ) )
    {
        fprintf (stderr,"Problems destroying feature vectors\n");
        exit(-1);
    }
    /* Clean up the schema */
    if ( vir_engDestroySchema(schema) ! VIR_OK )
    {
        fprintf (stderr, "Problems destroying the schema\n");
        exit(-1);
    }
    /* Clean up the engine*/
    if ( vir_engDestroyEngine(engine) != VIR_OK )
    {
        fprintf (stderr,"Problems destroying the engine\n");
        exit(-1);
    }
    return 0;
}
```

What is claimed is:

1. A search engine, comprising:

a function container capable of storing primitive functions;

a registration interface storing functions to the function container; and a primitive supplying primitive functions to the registration interface, wherein the primitive functions include an analysis function capable of extracting features from an object.

2. The engine defined in claim 1, wherein the primitive functions further comprise a comparison function to compare visual objects.

3. A search engine, comprising:

a set of primitives each having one or more functions capable of extracting attributes from a visual object and capable of determining similarity between visual objects;

a registration interface capable of registering the primitives; and a comparator function capable of applying functions of registered primitives so as to compare objects.

4. The engine defined in claim 3, further comprising an analysis function capable of deriving feature data from the object.

5. In a system comprising a search engine in communication with a database including a plurality of visual objects, a method of object comparison, comprising the steps of:

creating a custom primitive having an analysis function and a comparison function;

registering the custom primitive with the search engine via a registration interface;

applying the analysis function to at least a portion of the database objects and a query object; and applying the comparison function to the analyzed query object and at least a portion of the analyzed database objects.

6. The method defined in claim 5, additionally comprising the step of storing the analysis function and the comparison function in a function container.

7. The method defined in claim 5, additionally comprising the step of defining a custom primitive for extracting an attribute from an object.

8. The method defined in claim 5, additionally including the step of defining a schema of primitives for a specific domain of objects.

9. The method defined in claim 5, additionally including the step of assigning a primitive identification (ID) tag to the custom primitive.

10. The method defined in claim 7, wherein each object comprises an image.

11. The method defined in claim 10, wherein the attribute is extracted over the entire image.

12. The method defined in claim 10, wherein the attribute is extracted over only a portion of the image.

13. A method of extending a search engine for searching a database of visual objects, the method comprising the steps of:

providing a search engine primitive including a function to extract an attribute from a visual object;

adding a new primitive to the search engine via a registration interface, wherein the new primitive comprises a comparison function for a selected attribute; and comparing the extracted attributes from two visual objects with the comparison function.

14. The method defined in claim 13, wherein the adding step comprises subclassing and function overloading of the primitive.

* * * * *

UNITED STATES PATENT AND TRADEMARK OFFICE
CERTIFICATE OF CORRECTION

PATENT NO.     : 5,893,095                                                Page 1 of 1
DATED          : April 6, 1999
INVENTOR(S)    : Jain et al.

It is certified that error appears in the above-identified patent and that said Letters Patent is hereby corrected as shown below:

Column 1,
Line 11, please insert:

--                          Governmental Rights

This invention was made with Government support under Contract No. F33615-96-C-5615, awarded by Wright Laboratories, U.S. Air Force. The Government may have certain rights in this invention. --

Signed and Sealed this

Second Day of July, 2002

Attest:

Attesting Officer

JAMES E. ROGAN
*Director of the United States Patent and Trademark Office*